US006847916B1

(12) United States Patent
Ying

(10) Patent No.: US 6,847,916 B1
(45) Date of Patent: Jan. 25, 2005

(54) METHOD AND SYSTEM FOR MONITORING, CONTROLLING, AND LOCATING PORTABLE DEVICES PERFORMING REMOTE DIAGNOSTIC ANALYSIS OF CONTROL NETWORK

(75) Inventor: Jeffrey Ying, Glendora, CA (US)

(73) Assignee: I/O Controls Corporation, Azusa, CA (US)

(*) Notice: Subject to any disclaimer, the term of this patent is extended or adjusted under 35 U.S.C. 154(b) by 384 days.

(21) Appl. No.: 09/593,170

(22) Filed: Jun. 12, 2000

(51) Int. Cl.[7] .............................................. G01M 15/00
(52) U.S. Cl. ...................... 702/183; 702/62; 702/108; 702/122; 702/123; 702/182; 702/188
(58) Field of Search .................. 702/62, 108, 122–124, 702/182–188, FOR 103, FOR 104, FOR 134, FOR 135, FOR 170, FOR 171; 701/29, 35, 24, 30, 33, 34, 36, 200, 1, 107; 340/438, 539, 825.31; 700/2, 3, 4, 244, 286, 292, 293; 455/423, 424, 67.1, 67.7

(56) References Cited

U.S. PATENT DOCUMENTS

| 4,315,251 | A | | 2/1982 | Robinson et al. ........ 340/310 A |
| 5,173,855 | A | | 12/1992 | Nielsen et al. .............. 364/420 |
| 5,309,351 | A | | 5/1994 | McCain et al. ............. 364/132 |
| 5,745,049 | A | | 4/1998 | Akiyama et al. ...... 340/870.17 |
| 5,758,300 | A | | 5/1998 | Abe ............................. 701/33 |
| 5,815,071 | A | * | 9/1998 | Doyle ........................ 340/439 |
| 5,845,272 | A | | 12/1998 | Morjaria et al. .............. 706/50 |
| 5,884,202 | A | * | 3/1999 | Arjomand .................... 701/29 |
| 5,917,405 | A | * | 6/1999 | Joao ........................... 340/426 |
| 5,922,037 | A | | 7/1999 | Potts ............................ 701/29 |
| 5,963,882 | A | | 10/1999 | Viertl et al. .................. 702/39 |
| 5,987,394 | A | | 11/1999 | Takakura et al. ........... 702/123 |
| 6,006,147 | A | | 12/1999 | Hall et al. ..................... 701/29 |
| 6,029,508 | A | | 2/2000 | Schoenbeck et al. ......... 73/116 |
| 6,127,947 | A | * | 10/2000 | Uchida et al. .............. 340/999 |
| 6,169,943 | B1 | * | 1/2001 | Simon et al. ................. 701/29 |
| 6,177,867 | B1 | * | 1/2001 | Simon et al. ............... 340/468 |
| 6,181,994 | B1 | * | 1/2001 | Colson et al. ................ 701/33 |
| 6,236,917 | B1 | * | 5/2001 | Liebl et al. ................... 701/29 |
| 6,253,122 | B1 | * | 6/2001 | Razavi et al. .................. 701/1 |
| 6,253,129 | B1 | * | 6/2001 | Jenkins et al. ................ 701/29 |

(List continued on next page.)

FOREIGN PATENT DOCUMENTS

WO    WO 99/45517      9/1999    .......... G08C/15/12

OTHER PUBLICATIONS

Printout from "www.snapon.com" website, Snap–On Technologies, Inc., (undated), 8 pages.
"Phone Home; GE Transportation Systems' Remote Monitoring & Diagnostics Technology Helps Increase Train & Mining 'Up–Time,'" Yahoo! Finance, PR Newsire, Jul. 17, 2000.

*Primary Examiner*—Marc S. Hoff
*Assistant Examiner*—Carol S. W. Tsai
(74) *Attorney, Agent, or Firm*—Irell & Manella LLP

(57) ABSTRACT

A system and method for monitoring, diagnosing and/or testing a control network using portable, wireless equipment includes computerized display device connected to a wireless intermediary device for allowing a wireless connection to be made to a control network. The computerized diagnostic device may be embodied as a personal digital assistant (PDA) having a graphical screen display, on which may be displayed the network nodes and connections of the control network presented against a backdrop of a transit vehicle or other facility shown in three-dimensional, rotatable images. The wireless equipment may allow the operator to force individual system components to output states, and provide for real time monitoring. The portable, wireless equipment is programmed with information pertaining to the connections and locations of the components in the control network, thereby simplifying diagnosis or testing by the operator.

34 Claims, 23 Drawing Sheets

U.S. PATENT DOCUMENTS

| | | | |
|---|---|---|---|
| 6,263,268 B1 * | 7/2001 | Nathanson | 701/29 |
| 6,301,531 B1 * | 10/2001 | Pierro et al. | 701/29 |
| 6,317,029 B1 * | 11/2001 | Fleeter | 340/10.32 |
| 6,317,668 B1 * | 11/2001 | Thibault | 701/35 |
| 6,321,142 B1 * | 11/2001 | Shutty | 701/1 |
| 6,324,659 B1 * | 11/2001 | Pierro | 714/48 |
| 6,330,499 B1 * | 12/2001 | Chou et al. | 701/33 |
| 6,336,065 B1 * | 1/2002 | Gibson et al. | 701/29 |
| 6,338,152 B1 * | 1/2002 | Fera et al. | 714/48 |
| 2001/0012976 A1 * | 8/2001 | Mening et al. | 701/1 |
| 2002/0004694 A1 * | 1/2002 | Mcleod et al. | 701/29 |

* cited by examiner

FIG. 20.

DINEX RF TEST  [OK] [X]

| Module RFID | [IIIII] | [Test RF] | [Test 232] |
| Module DinexID | [0] | [DD7 Read] | [HCNC Read] |
| Input Data for DD7 Write/HCNC Write | [65535] | | [DD7 Write] |
| Input <0-9> to read/ write V0-V7, T0-T1 | [0] | | [HCNC Write] |
| [Read RFID] | Change RFID | [RFID] | [Write RFID] |

Rx Message [                    ]
[Clear]
Tx Message [                    ]

FIG. 21.

[←] [→] [📖 Contents] [◇ All Topics] [X]   530

Input Panel Help

Bus Info
System
Input
Output
Real Time
Power
Logo
Security
Recorder
Note Taker
DINEX RF
Windows CE Basics
Input Panel

---

Bus Info
You can use this application to specify the ID of the bus you want to connect and to specify the bus type

METHOD AND SYSTEM FOR MONITORING, CONTROLLING, AND LOCATING PORTABLE DEVICES PERFORMING REMOTE DIAGNOSTIC ANALYSIS OF CONTROL NETWORK

BACKGROUND OF THE INVENTION

1) Field of the Invention

The field of the present invention relates to diagnostic and maintenance tools for control networks.

2) Background

Electronic control systems are commonly used in a number of manufacturing, transportation, and other applications, and are particularly useful to control machinery, sensors, electronics, and other system components. Manufacturing or vehicular systems, for example, may be outfitted with a variety of sensors and electrical and/or mechanical parts that may need to be activated, deactivated, monitored, enabled, disabled, adjusted or otherwise controlled when needed to perform their predefined functions. Control of the various system components is generally accomplished by providing suitable electronic signals to various actuators, relays, switches, or other control points within the system. Control systems often require that processes be carried out in a prescribed order, or with a level of responsiveness, that precludes sole reliance on manual control. Also, such systems may employ sensors or other components that require continuous or periodic monitoring or control, and therefore lend themselves to automated or semi-automated control.

A variety of different network architectures for controlling electronic systems have been developed or proposed. Examples of various control networks include programmable logic controller (PLC) based multiplexed control systems in which a single central processing unit (CPU) is used to control a number of input/output (I/O) modules or network nodes; network-controlled multiplexed control systems in which a network of interconnected CPUs are used to control a number of I/O modules at the various network nodes; and hierarchical, master-slave multi-bus control systems, wherein CPU-driven network nodes are connected together at each bus level in a loop configuration.

In most control networks, it is necessary to be able to diagnose operational problems that may occur within the system. Operational problems may result from wiring faults, component failures (either in the control network or in the components being controlled by the control network), or logic flaws, among other reasons. Also, it may be necessary to test the operation of the controls system from time to time, such as when components are added or removed, or when functionality of the control system is added or changed.

Traditionally, diagnosis and testing of a control network is carried out by manual activation of switches, relays.or actuators, and observing the results on the input/output devices of the control system. Conventional meters (e.g., an Ohm-meter) may be used to determine if electrical signals from the control network are reaching the intended destination(s). Due to the different types of operational problems that can occur (e.g., wiring fault vs. component failure), and the myriad of possible places in which a fault or failure could occur, locating the source of an operational problem can be an extremely slow and laborious process. With the increasing complexity of control systems and the steadily growing number of components used in such systems, diagnosis and testing become even more critical and, in many respects, more difficult.

To conduct a complete manual test or diagnosis of a control system can be very time consuming and tedious. The test personnel generally need to read complicated circuit blueprints and locate each relay, switch, actuator or other component that needs to be tested. Often, multiple relays, switches or actuators will need to be activated, switched or otherwise positioned to test a particular system component. In such a case, the test personnel needs to locate and set each such relay, switch and/or actuator to its proper position, which can be a lengthy process. In many control systems, simply locating the appropriate switches, relays or actuators can be difficult, especially if the control system is complex and includes many components. Also, particularly in the case of on-board control systems used in vehicles (such as buses or rail cars), the switches, relays or actuators can be located in inconvenient places and thus hard to find or set to reach manually.

Diagnosis and testing of a control network is sometimes carried out by connecting a test computer (usually a laptop or other portable computerized device) to a diagnostic and maintenance port of the control network. The test computer is generally programmed to receive various types of information from the control network to allow an operator to monitor the functioning of the control system. The test computer may also be used to download new programming instructions to the control network via the diagnostic and maintenance port.

An illustration of a test computer set-up for monitoring a control network is illustrated in FIG. 1. As shown in FIG. 1, a vehicle 101 (shown in phantom for convenience of illustration) has a control network 110 (shown in solid, dark lines) with various I/O modules dispersed throughout the vehicle 101. A test computer 103 connects by a cord 106 to a module 112 containing the diagnostic and maintenance port. The test computer 103 is thereby able to monitor the functioning of the control network 110.

FIGS. 2, 3 and 4 are diagrams of test computer set-ups for different control networks as known in the art. FIG. 2 illustrates a hierarchical, master-slave control network 120, having a master bus controller (MBC) 125 connected to a common bus 138, which connects various network nodes in a loop configuration. The network nodes may include, for example, high-speed cell net controller (HCNC) modules 128 and digital input/output (DIO) modules 127, or other types of modules, all of which generally operate in a slave mode with respect to the common bus 138. The control network 120 may also include one or more secondary buses (not shown). Further information about certain types of hierarchical, master-slave control networks may be found in U.S. Pat. No. 5,907,486 and Japanese Patent documents 10-326259 and 10-333930, all of which are assigned to the assignee of the present invention and hereby incorporated by reference as if set forth fully herein. The control network 120 may be physically connected to a test computer 123 from time to time through an RS-485 compatible diagnostic and maintenance port 129, for the purpose of testing and monitoring the functionality of the control network 120 as generally described above.

FIG. 3 is a diagram of a PLC-based multiplexed control system 140, in which a single main central processing unit (CPU) 146 is used to monitor and control a number of network nodes 150. Each network node 150 typically includes a programmable logic controller (PLC) which, in turn, monitors various input signals or conditions (such as temperature, current, speed, pressure and the like) and generates output signals to various output devices (such as actuators, relays or switches) through input/output (I/O)

modules 152, thus providing localized control at various network node sites. The main control network CPU 146 communicates with the PLCs of each of the network nodes 150 over a main system bus 147, and provides top-level command and control. The main control network CPU 146 may be physically connected to a test computer 149 from time to time through an RS-232 compatible diagnostic and maintenance port 148, for the purpose of testing and monitoring the functionality of the control network 140 as previously described.

FIG. 4 is a diagram of a network-controlled multiplexed control system 160 in which a network of interconnected CPUs 170 are used to control a number of I/O modules 172. A main CPU 166 is connected to other dispersed CPUs 170 over a control area network (CAN) bus or device net 167. The CAN bus or device net 167 may be physically connected to a test computer 169 from time to time through a CAN bus or device net gateway 175, which connects to the CAN bus or device net through a CAN bus or device net test port 168. Testing or monitoring of the functionality of the control network 160 may thus be carried out, as previously described.

While the use of a computer to monitor the functioning of a control system has some advantages, present systems have limitations and drawbacks. For example, the test computer generally must be kept close to the diagnostic and maintenance port, due to the cord 106 (as shown in FIG. 1) connecting the test computer to the diagnostic and maintenance port. This arrangement physically limits where the test personnel can view relevant information. Thus, test personnel working at the back of the vehicle 101, for example, could not view the information being shown on the test computer 103. Therefore, the test personnel would need to walk back and forth between the test computer 103 and the pertinent locations of the vehicle 101 in order to carry out an ongoing test or diagnostic procedure. Further, the test personnel often need to refer to complicated circuit blueprints to interpret the information on the test computer 103 and to locate the various locations of interest within the control network 110 of the vehicle 101. Such blueprints are usually in paper form and are cumbersome to deal with. Cross-referencing between the circuit blueprints and the information on the test computer 103 takes extra time and effort on the part of the test personnel, and may be the source of human error in conducting a test or system diagnosis. Further, the types of testing, monitoring and diagnosis that can be conducted using a test computer 103, at least as conventionally practiced, are limited.

Some systems for wireless diagnosis or monitoring have been proposed in contexts such as diagnostic analysis of an automobile or similar vehicle. Examples of such wireless systems may be found in U.S. Pat. Nos. 5,758,300 and 5,884,202. Conventional wireless diagnostic and monitoring systems typically involve a portable wireless unit that is specifically configured for a single type of application. Therefore, such portable wireless units are useless for monitoring systems other than the type for which they are specifically configured. Creating a custom portable wireless unit for each type of control network can be expensive and time-consuming. Also, despite being wireless, the type of information and test functionality they provide is limited, and most, if not all, such wireless systems do not have the functionality to operate in the context of a sophisticated control network.

Therefore, a need presently exists for a flexible, versatile and simple to use test and diagnosis tool suitable for either simple or complex control network systems.

SUMMARY OF THE INVENTION

The invention in one aspect provides a system and method for monitoring, diagnosing and/or testing a control network using portable, wireless equipment.

In one embodiment as disclosed herein, a portable, wireless intermediary device connects to a diagnostic device which is programmed to allow for diagnosis and testing of a control network. The diagnostic device preferably is embodied as a personal digital assistant (PDA) preferably comprising, among other things, an on-board computer and a graphical screen display. The portable, wireless intermediary device includes a line interface (either serial or parallel) to the diagnostic device, and receives, formats and modulates the output of the diagnostic device for communication over a wireless channel to a wireless interface unit connected to the control network. The portable, wireless intermediary device thereby enables wireless communication between the diagnostic device and the control network, allowing testing, monitoring and/or diagnosis of the control network.

In one embodiment, the portable, wireless equipment is programmed to test, monitor and/or diagnose a control network. The portable, wireless equipment preferably comprises a graphical screen display for displaying images to the operator useful for testing, monitoring and/or diagnosing the control network. The displayed images may include an illustration of all or part of the control network within the context of the facility (e.g., building, vehicle, plant, robot, machine or other facility), to facilitate the operator's testing, monitoring and/or diagnosis of the control network. The image of the facility may be presented on the graphical screen display in phantom to allow the operator to easily view the components of the control network being observed or tested.

In another embodiment, the portable, wireless equipment is programmed to allow the operator to force individual system components to a desired output state. By entering various inputs, the operator causes test commands to be conveyed wirelessly from the portable, wireless equipment to the control network, whereupon the test commands are relayed to the appropriate system component. If working properly, the system component changes state to the desired output state. The portable, wireless equipment is preferably programmed to receive feedback from the control network over the wireless connection, and to display the states of the relevant switches along the output path to the system component being tested or observed. The portable, wireless equipment is programmed with information pertaining to the connections and locations of the components in the control network, thereby simplifying diagnosis or testing by the operator, and reducing or eliminating the need for the operator to carry and interpret bulky, cumbersome manuals and circuit blueprints.

In another embodiment, the portable, wireless equipment includes an automated procedure for testing a line connection between a diagnostic device carried by an operator and a portable, wireless intermediary device which facilitates wireless communication to the control network. The portable, wireless equipment may also include an automated procedure for testing the wireless connection between the portable, wireless intermediary device and the control network.

Further embodiments, variations and enhancements are also described herein.

BRIEF DESCRIPTION OF THE DRAWINGS

FIG. 20 is an example of an RF test screen as may be used, for example, in the computerized diagnostic device illustrated in FIG. 12.

FIG. 21 is an example of a system help screen as may be used, for example, in the computerized diagnostic device illustrated in FIG. 12.

DETAILED DESCRIPTION OF PREFERRED EMBODIMENTS

Various systems and methods for monitoring, diagnosing and/or testing a control network using portable, wireless equipment will now be described in connection with preferred embodiments of the invention.

Figure 1:
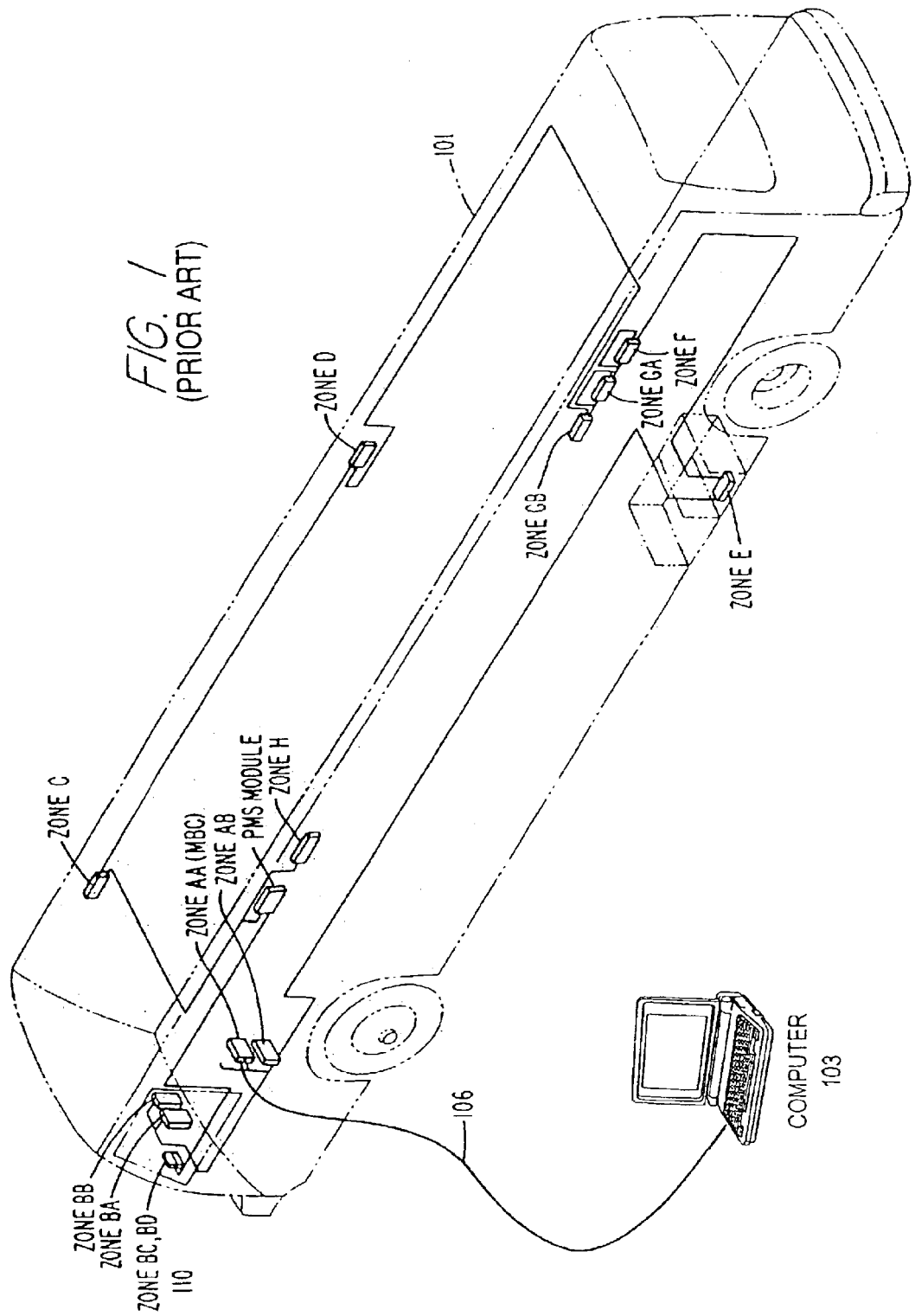
FIG. 1 is a diagram illustrating a control network diagnostic technique as known in the prior art.
Figure 5:
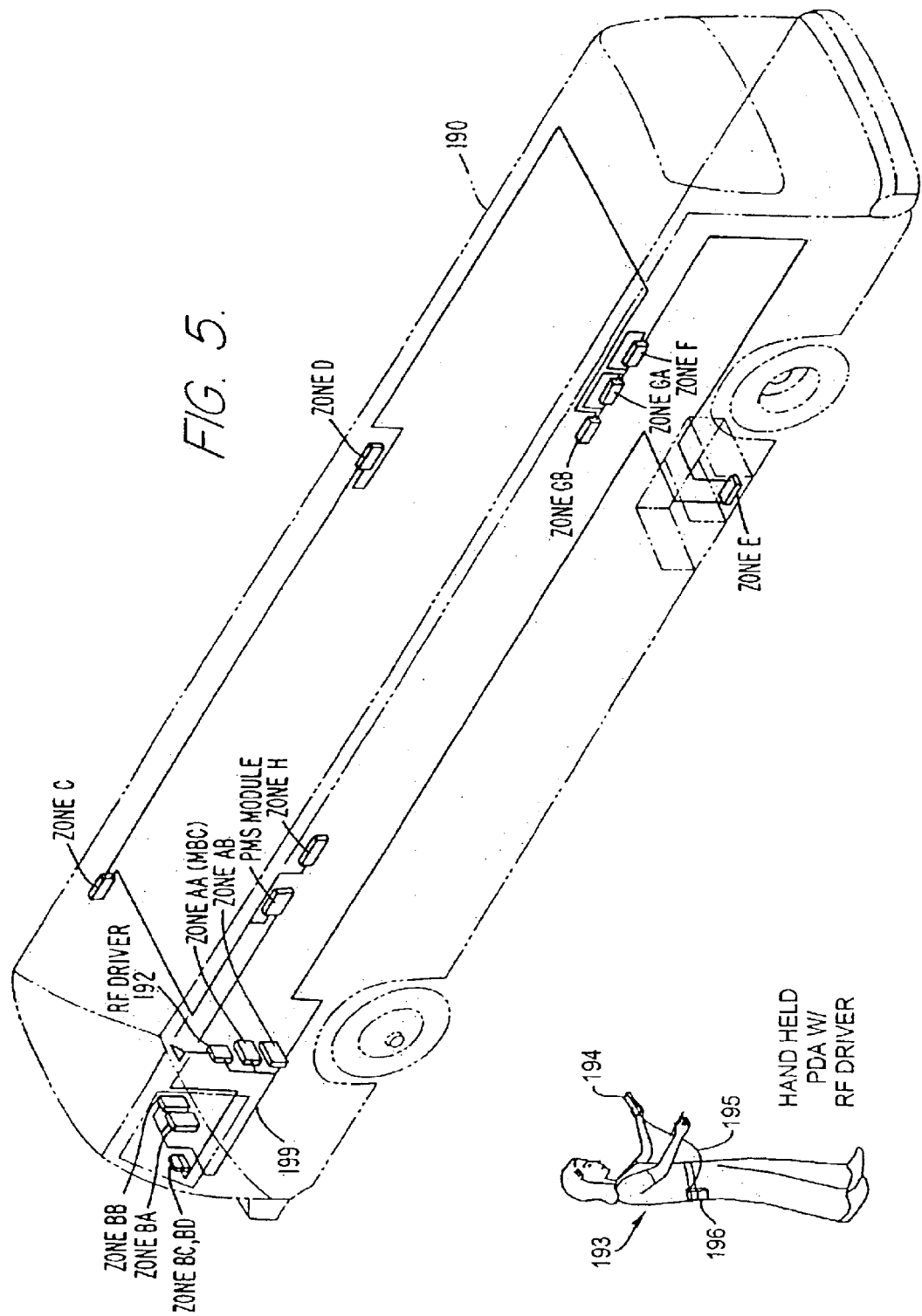
FIG. 5 is a diagram illustrating a control network diagnostic technique in accordance with a preferred embodiment as disclosed herein.
Figure 6:
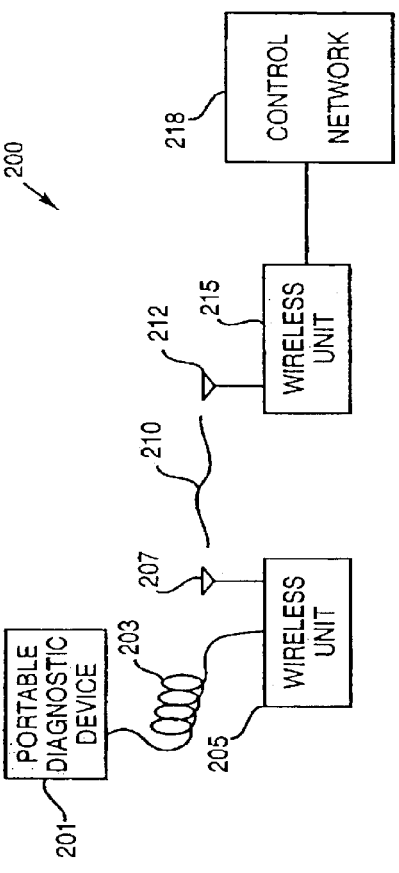
FIG. 6 is a top-level diagram of a remote diagnostic system in accordance with a preferred embodiment as disclosed herein.

FIG. 5 is a diagram illustrating concepts of control network diagnosis and/or testing in accordance with a preferred embodiment as disclosed herein, as exemplified by a control network system deployed in a mobile vehicle 190 (in this example, a bus). As illustrated in FIG. 6, the vehicle 190 (shown in phantom) has a control network 199 (shown in dark, solid lines within the vehicle 190) for controlling circuitry and system components located throughout the vehicle 190, much the same as the control network shown in FIG. 1. However, the control network 199 shown in FIG. 5 also includes a wireless diagnostic and maintenance linking device (e.g., an radio frequency (RF) driver) 192 for providing a wireless connection to portable wireless equipment utilized by an operator 193. The wireless equipment preferably includes a handheld, computerized diagnostic device 194, such as a personal digital assistant (PDA) or similar device which is programmed to provide testing and diagnostic functionality, and a wireless intermediary device 196. The computerized diagnostic device 194 connects to the wireless intermediary unit 196 by a connector cord 195 or other suitable means. The wireless intermediary unit 196 is configured to communicate with the wireless diagnostic and maintenance linking device 192, thereby allowing wireless communication between the computerized diagnostic device 194 and the control network 199. The operator 193 can thus, for example, perform at least all of the test and diagnosis operations that could be performed by connecting a test computer to the control network 199, but without being restricted as to mobility. The computerized diagnostic device 194 also preferably includes further functionality as described herein.

FIG. 6 is a top-level block diagram of a remote diagnostic system 200 in accordance with a preferred embodiment as disclosed herein. As illustrated in FIG. 6, the remote diagnostic system 200 comprises a portable, computerized diagnostic device 201 (such as a personal digital assistant (PDA)) which is connected to a wireless intermediary unit 205 for the purpose of allowing wireless communication with a control network 218. The wireless intermediary unit 205 is configured to communicate with a wireless diagnostic and maintenance linking device 215 which provides wireless access to the control network 218.

Figure 2:
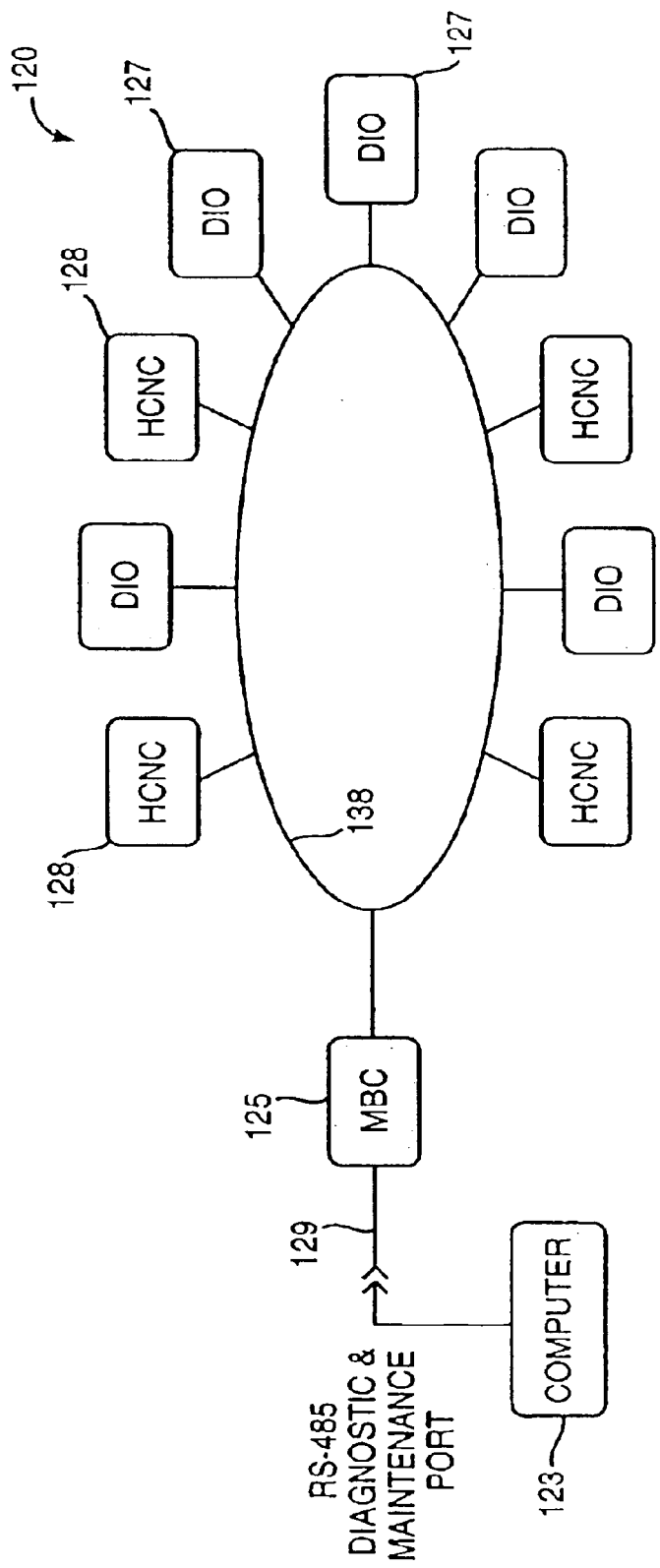
FIGS. 2, 3 and 4 are diagrams of different control networks as known in the art.
Figure 3:
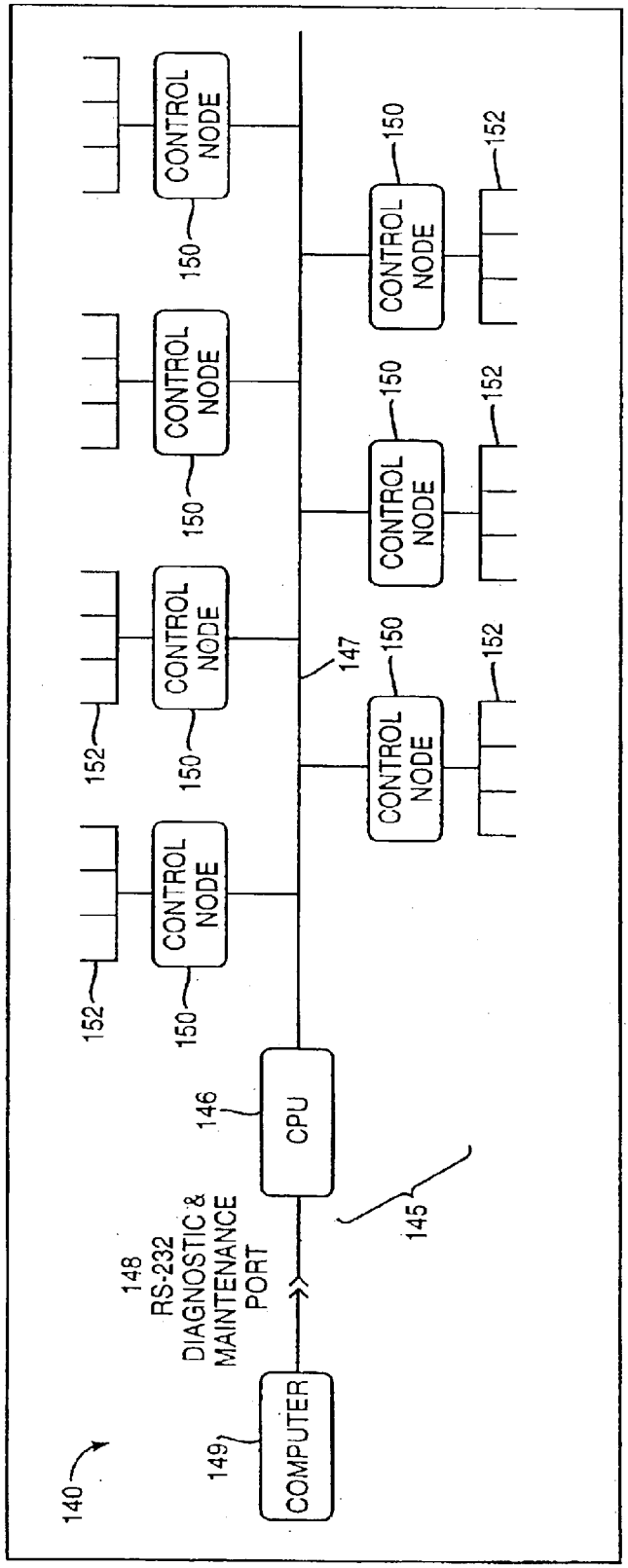
Figure 4:
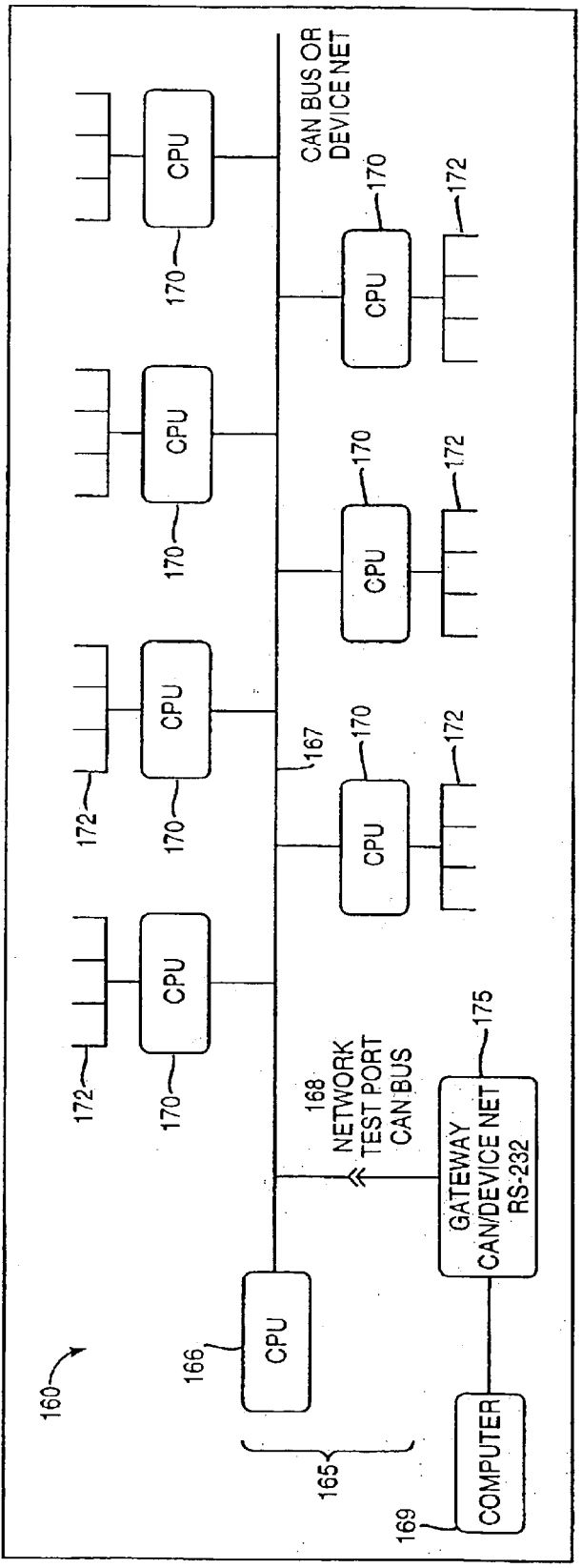

The control network 218 may take the form of any type of network, and may include, for example, a hierarchical master-slave control network such as depicted in FIG. 2, a PLC-based control network as depicted in FIG. 3, a CAN bus or device net control network as depicted in FIG. 4, or any other type of control network, including control networks that are fairly simple or substantially more complex than those depicted in FIGS. 2, 3 and 4. The wireless diagnostic and maintenance linking device 215 may itself connect to an existing diagnostic and maintenance port (such as ports 129, 148 and 168 illustrated in FIGS. 2, 3 and 4, respectively) of the control network 218, thereby being compatible with control networks 218 which have a built-in capability for connecting non-wirelessly to a test computer.

Figure 7:
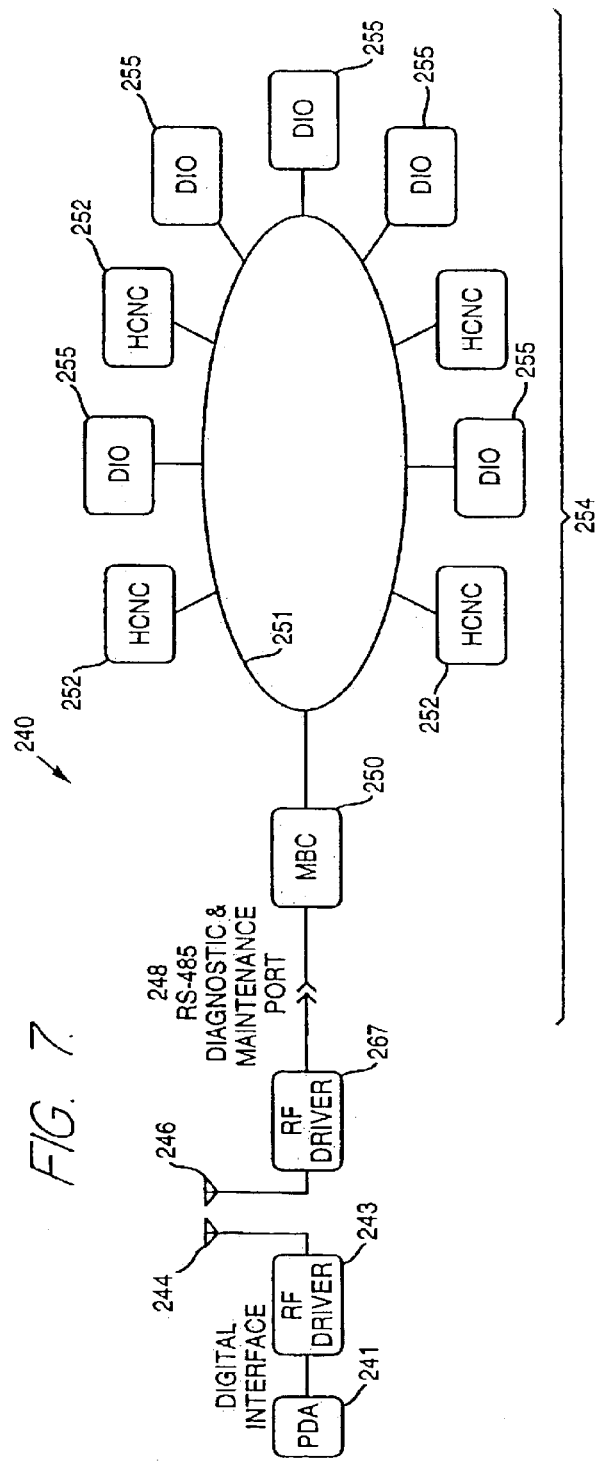
FIGS. 7, 8 and 9 are diagrams of the remote diagnostic system of FIG. 6 as applied to various different types of control networks.
Figure 8:
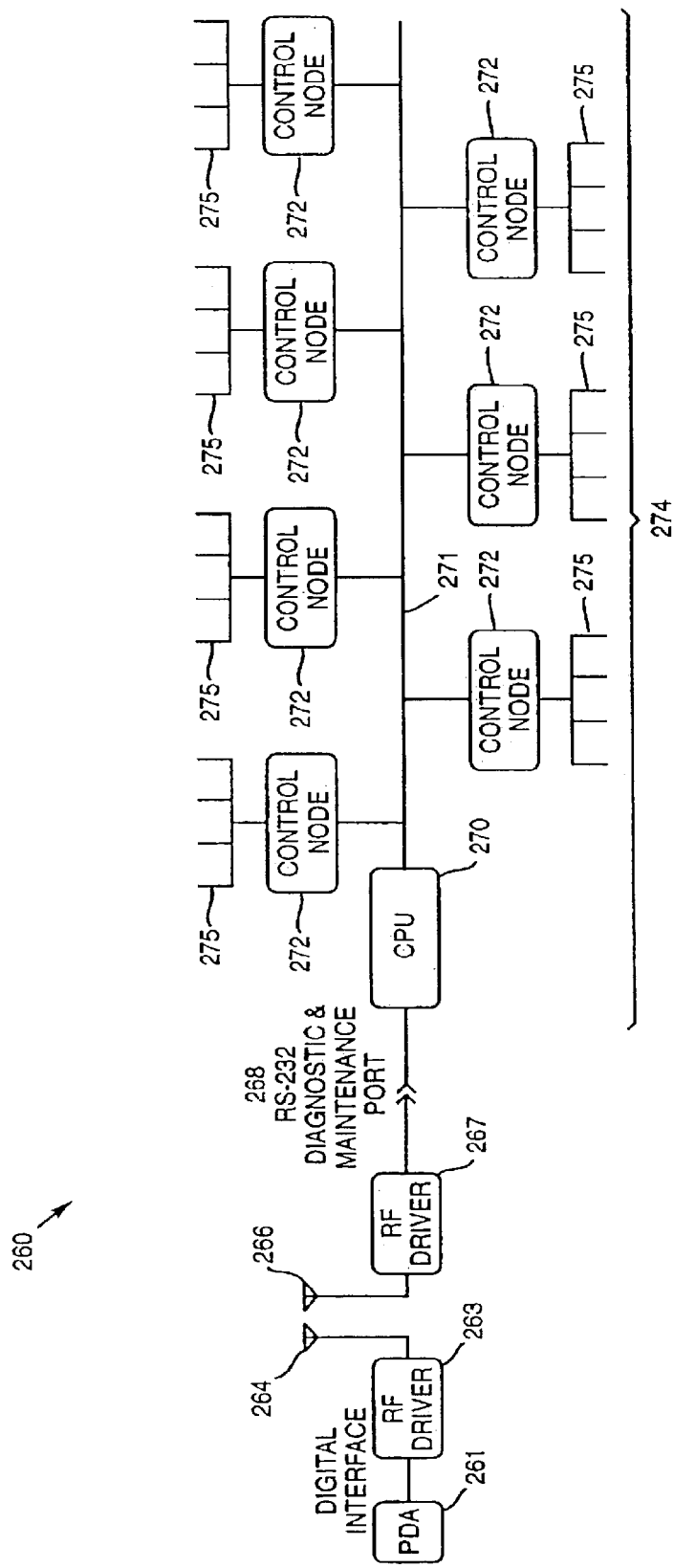
Figure 9:
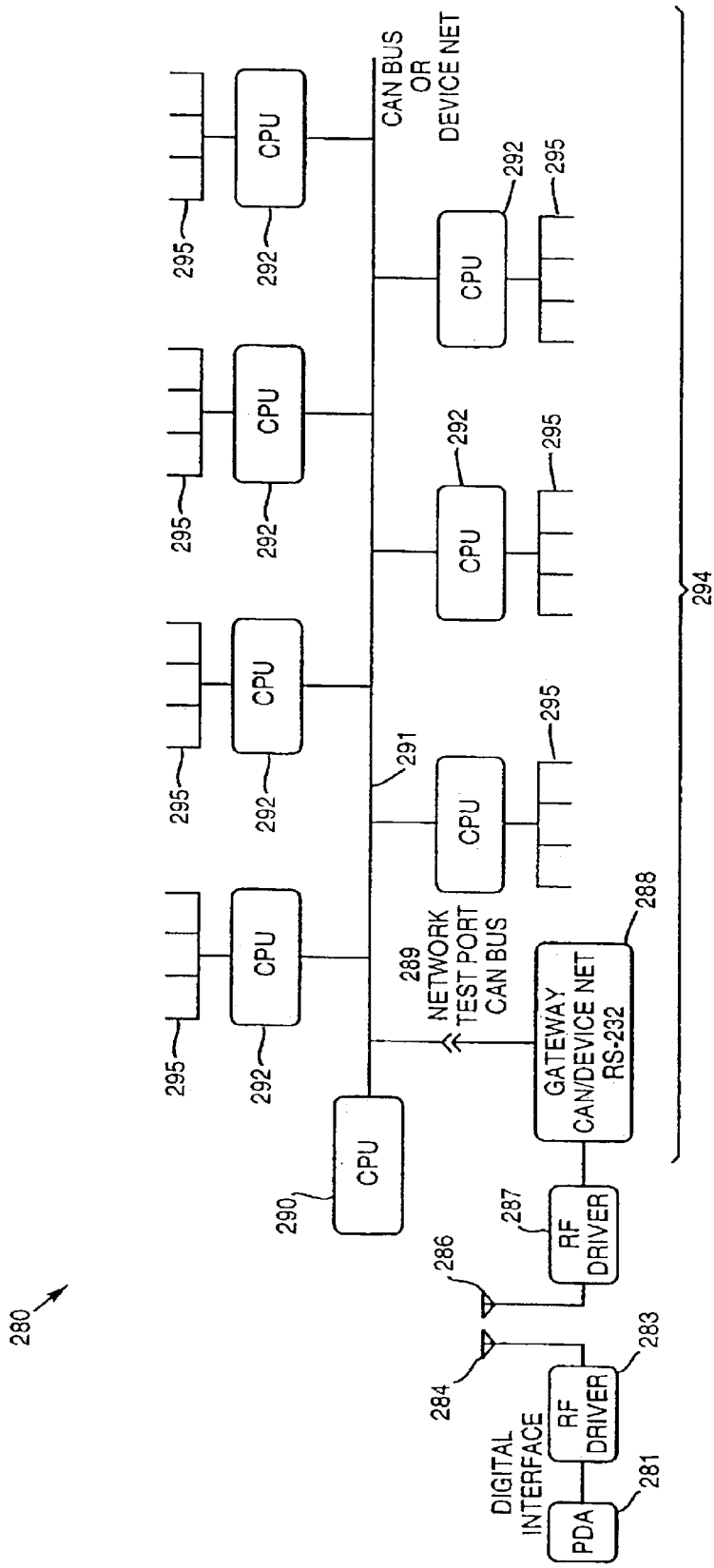

FIGS. 7, 8 and 9 are diagrams illustrating concepts of the remote diagnostic system 200 shown in FIG. 6 as applied to various different types of control networks 218. In FIG. 7, for example, is shown a control network system 240 wherein a handheld, computerized diagnostic device 241 (preferably embodied as a personal digital assistant (PDA)) communicates with a hierarchical, master-slave control network 254 over a wireless communication link. The computerized diagnostic device 241 is connected to a wireless intermediary unit 243 (preferably embodied as an RF driver) which preferably has, among other things, an antenna 244 for facilitating wireless RF communication. The computerized diagnostic device 241 sends commands and other instructions in a digital format to the wireless intermediary unit 243, which re-formats (if necessary) and modulates the data over an RF communication link. The wireless diagnostic and maintenance linking device 247 (also preferably embodied as an RF driver) receives the modulated data from the wireless intermediary unit 243, demodulates the received data and places it in a format compatible with the control network 254. In the example of FIG. 7, the control network 254 includes an RS-485 compatible diagnostic and maintenance port 248, and so the wireless diagnostic and maintenance linking device 247 would place the received information in a format compatible with the RS-485 protocol. However, any other type of interface between the wireless diagnostic and maintenance linking device 247 and the control network 254 may also be used.

In a similar fashion, the wireless diagnostic and maintenance linking device 247 receives information from the control network 254, re-formats the information (if necessary) and modulates it for communication over an RF communication link (which may be the same or different RF channel as utilized on the forward link). The wireless intermediary device 243 receives the modulated data from the wireless diagnostic and maintenance linking device 247, demodulates the received data and places it in a format compatible with the computerized diagnostic unit 241.

The control network 254 shown in FIG. 7 may comprise any hierarchical, master-slave network or loop configured network, and may have one or more common buses, arranged in a single-tier (if one bus) or a multi-tier, hierarchical architecture. Illustrative (but not exhaustive) examples of various types of control network architectures that be included as part of the control network 254 are illustrated and/or described in U.S. Pat. No. 5,907,486, Japanese Patent documents 10-326259 and 10-333930, and U.S. Patent application Ser. No. 08/854,160 (entitled "Backup Control Mechanism In A Distributed Control Network"), Ser. No. 08/853,893 (entitled "Fault Isolation and Recovery In A Distributed Control Network"), Ser. No. 08/853,989 (entitled "Multi-Tier Architecture for Control Network"), and Ser. No. 09/442,368 (entitled "Control Network with Matrix Architecture"), all of which are assigned to the assignee of the present invention and hereby incorporated by reference as if set forth fully herein.

FIG. 8 is a diagram of a similar control network system 260 wherein a handheld, computerized diagnostic device 261 (preferably embodied as a personal digital assistant (PDA)) communicates with a PLC-based control network 274 over a wireless communication link. Similar to the control network system 240 shown in FIG. 7, in FIG. 8 the computerized diagnostic device 261 is connected to a wireless intermediary unit 263 (preferably embodied as an RF driver) which preferably has, among other things, an antenna 264 for facilitating wireless RF communication. The computerized diagnostic device 261 sends commands and other instructions in a digital format to the wireless intermediary unit 263, which re-formats (if necessary) and modulates the data over an RF communication link. A wireless diagnostic and maintenance linking device 267 (also preferably embodied as an RF driver) receives the modulated data from the wireless intermediary unit 263, demodulates the received data and places it in a format compatible with the control network 274. In the example of FIG. 8, the control network 274 includes an RS-232 compatible diagnostic and maintenance port 268, and thus the wireless diagnostic and maintenance linking device 267 would place the received information in a format compatible with the RS-232 protocol. However, any other type of interface between the wireless diagnostic and maintenance linking device 267 and the control network 274 may also be used.

A similar sequence of events occurs in the opposite direction to convey information from the control network 274 to the wireless diagnostic device 261. Thus, the wireless diagnostic and maintenance linking device 267 receives information from the control network 274, re-formats the information (if necessary) and modulates it for communication over an RF communication link (which may be the same or different RF channel as utilized on the forward link). The wireless intermediary device 263 receives the modulated data from the wireless diagnostic and maintenance linking device 267, demodulates the received data and places it in a format compatible with the computerized diagnostic unit 261.

FIG. 9 is a diagram of another control network system 280 wherein a handheld, computerized diagnostic device 281 (preferably embodied as a personal digital assistant (PDA)) communicates with a CAN bus (or device net) based control network 294 over a wireless communication link. Similar to the control network systems 240 and 260 shown in FIGS. 7 and 8, respectively, in FIG. 9 the computerized diagnostic device 281 is connected to a wireless intermediary unit 283 (preferably embodied as an RF driver) which preferably has, among other things, an antenna 284 for facilitating wireless RF communication. The computerized diagnostic device 281 sends commands and other instructions in a digital format to the wireless intermediary unit 283, which re-formats (if necessary) and modulates the data over an RF communication link. A wireless diagnostic and maintenance linking device 287 (also preferably embodied as an RF driver) receives the modulated data from the wireless intermediary unit 283, demodulates the received data and places it in a format compatible with the control network 294. In the example of FIG. 9, the control network 294 includes a CAN bus or device net compatible diagnostic and maintenance port 289 and a CAN bus or device net gateway 288, and thus the wireless diagnostic and maintenance linking device 287 would place the received information in a format compatible with the CAN bus or device net gateway 288. However, any other type of interface between the wireless diagnostic and maintenance linking device 287 and the control network 294 may also be used.

A similar sequence of events occurs in the opposite direction to convey information from the control network 294 to the wireless diagnostic device 281. Thus, the wireless diagnostic and maintenance linking device 287 receives information from the control network 294, re-formats the information (if necessary) and modulates it for communication over an RF communication link (which may be the same or different RF channel as utilized on the forward link). The wireless intermediary device 283 receives the modulated data from the wireless diagnostic and maintenance linking device 287, demodulates the received data and places it in a format compatible with the computerized diagnostic unit 281.

Figure 10:
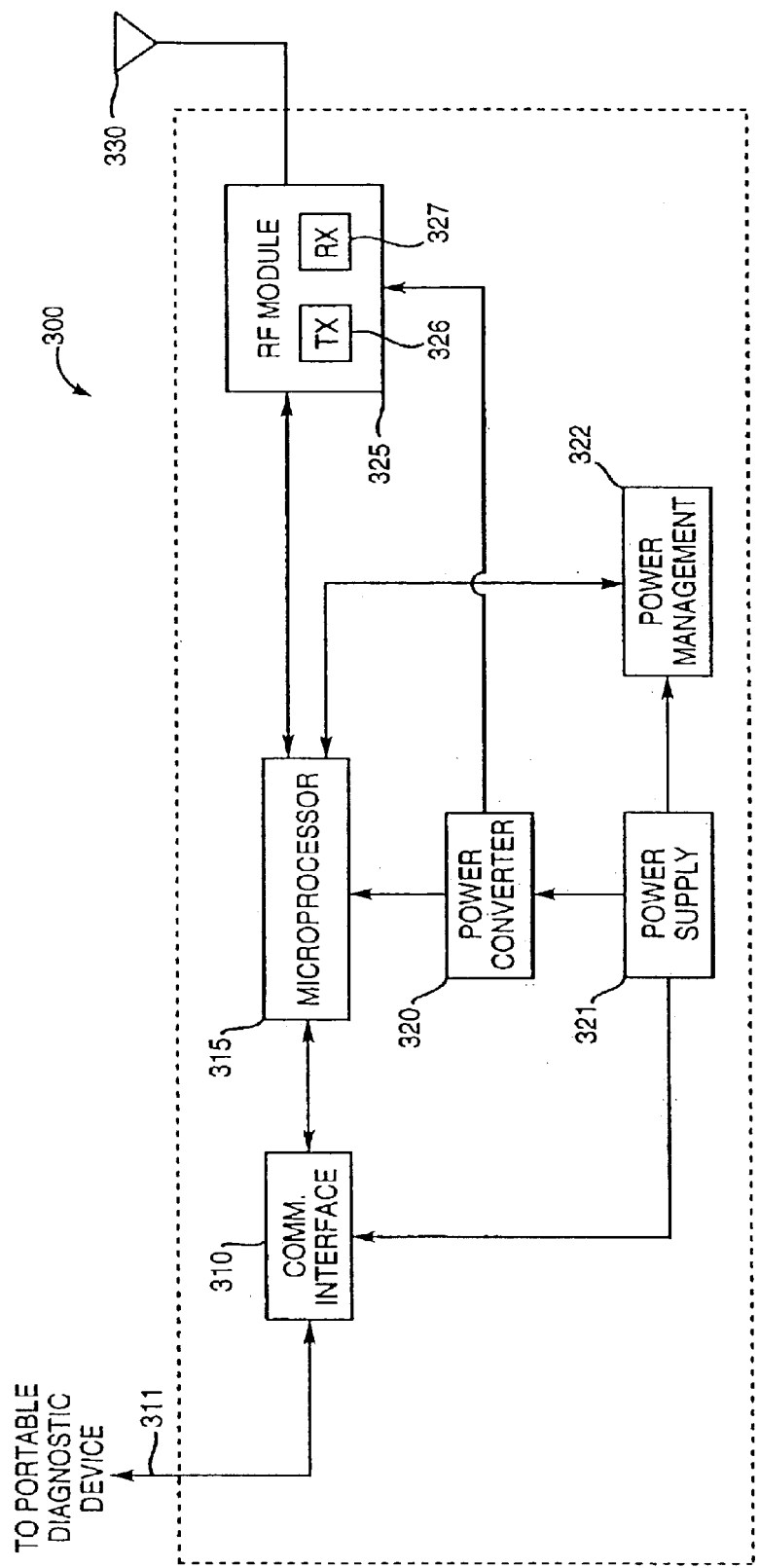
FIG. 10 is a diagram of a preferred wireless intermediary unit for connecting a remote diagnostic device to a control network, as may be used, for example, in any of the remote diagnostic systems depicted in FIGS. 6 through 9.

FIG. 10 is a diagram of a preferred wireless intermediary unit 300 for connecting a remote diagnostic device to a control network, as may be used, for example, in any of the remote diagnostic systems depicted in FIGS. 6 through 9 (for example, as wireless intermediary unit 205, 243, 263 or 283). As illustrated in FIG. 10, the wireless intermediary unit 300 preferably comprises a communication interface 310 which connects by a cord 311 to a portable computerized diagnostic device (such as any of the computerized diagnostic devices 201, 241, 261 or 281 shown in FIGS. 6, 7, 8 and 9, respectively). The nature of the communication interface 310 depends upon the nature of the computerized diagnostic device, and may be, for example, a serial interface (such as an RS-232 or Universal Serial Bus (USB) interface), a parallel interface or fiber optic interface. The communication interface 310 is connected to a-microprocessor 315 (which includes any necessary RAM, ROM or peripheral components), which in turn connects to a communications module 325. The wireless intermediary unit 300 also preferably comprises a power sub-system (unless it receives power from an external source, such as the computerized diagnostic device), comprising a power supply 321, a power converter 320 and a power management circuit 322.

In a preferred embodiment, the communications module 325 communicates over radio frequencies, and thus is, in essence, an RF module. The communications module 325 preferably comprises a transmitter 236 and a receiver 327, and is preferably connected to an antenna 330. The receiver 327 may, for example, be a double conversion superheterodyne variety.

In operation, the wireless intermediary unit 300 acts as a wireless interface between a computerized diagnostic device and a control network. The wireless intermediary unit 300 receives information (preferably in a digital format) from the computerized diagnostic device over the communications interfaced 310, formats the information for transmission, and modulates the information over a wireless communication channel. The steps involved in formatting and modulating the information from the computerized diagnostic unit depend upon the format in which the information is received, the format in which the receiving device expects the information, and the nature of the physical link (i.e., the wireless communication channel). If the communications interface 310 to the computerized diagnostic device comprises a parallel interface, for example, then the microprocessor 315 may convert the incoming parallel data into serial data to facilitate transmission by the RF module 325. In any event, the microprocessor 315 and/or RF module 325 may add header bits, error correction and/or encoding to the message being transmitted. In the opposite direction, the RF module 325 and/or microprocessor 315 may demodulate, decode, error check and/or strip header bits from information received over the wireless channel from the control network.

In a preferred embodiment, the communications interface 310 comprises an RS-232 compatible interface, which has the advantage of allowing compatibility with many personal digital assistant (PDA) devices. The microprocessor 315 and/or communications interface 310 are preferably programmed so as to be compatible with a Windows CE™ or LINUX compatible platforms as may be used in the computerized diagnostic device to which the wireless intermediary device 300 is connected.

The RF module 325 may employ frequency modulation (FM) techniques and/or spread spectrum encoding and decoding of transmitted signals. The frequency band may be any that is suitable, such as, for example, 400 MHz, 300 MHz, 900 MHz, or 2.4 GHz. The frequency band may be determined by inserting the appropriate one of several RF module chips, or else may be made selectable by the operator using switch settings. A voltage-controlled oscillator (VCO) responsive to the switch settings may be used to generate the different frequencies. Alternatively, the switch settings may affect both frequency settings and communication protocols, so that the same wireless intermediary device 300 can be used for different types of control networks using different wireless communication interfaces. Each switch setting can correspond to a specific control network type, and thus be associated with a specific frequency band and communication protocol. The switch settings can be set manually through switches on the exterior of the wireless intermediary device 300, or else may be selected through various configuration options provided on the screen display of the computerized diagnostic device.

In one embodiment, the power sub-system provides power to the communication interface 310, microprocessor 315 and RF module 325. A power supply 321 includes a battery (which can be alkaline or lithium (rechargeable), for example) or other low voltage power source. In a preferred embodiment, the power supply 321 comprises a 3.6 volt battery. A power converter 320 is provided to the voltage level of the 3.6 volt battery to a 5 volt level suitable for the microprocessor 315 and RF module 325. The power management circuit 322, among other things, determines whether the battery level is high, medium or low. This information may be made available to the operator through one or more LEDs, a guage, or LCD display, for example. As an alternative to an on-board power supply 321, or in addition thereto, power may also be brought info the wireless intermediary device 300 from an external source, such as the computerized diagnostic device.

The wireless intermediary unit 300 preferably includes a lightweight, durable moisture-resistant housing or encasement that may be manufactured from any of a variety of materials, including, for example, plastic or aluminum (or other lightweight metal). The housing or encasement (not shown) of the wireless intermediary unit 300 preferably includes suitable means for allowing it to be physically carried by an operator (thus facilitating its transportability), such as, for example, a belt clip, or small hoops for allowing the fastening of a strap of similar means for securing the wireless intermediary unit 300 to the body of the operator. Alternatively, the operator may wear a belt having a pouch or pocket for placing the wireless intermediary unit 300. Because it is generally advantageous for an operator to be able to carry around the wireless intermediary unit 300, it is preferably small in size, with on-board components integrated to the extent reasonably possible. It should be possible to manufacture the necessary circuitry and components for the wireless intermediary unit 300 in a size similar to that of conventionally available cellular or pocket telephones, many of which contain microprocessors, RF circuitry and a local power supply.

It should be noted that generally the wireless intermediary unit 300 will connect to the computerized diagnostic device by a cord, cable, wire or other physical means, but in some circumstances a wireless connection between the wireless intermediary unit 300 and the computerized diagnostic device may be desirable.

Referring once again to the top-level block diagram in FIG. 6, in accordance with one or more embodiments as disclosed herein, the computerized diagnostic device 201 is programmed to test, monitor and/or diagnose a control network 218 by communicating to the control network 218 through the wireless intermediary device 205. The computerized diagnostic device 201 preferably comprises a graphical screen display for displaying images, text and other information to the operator useful for testing, monitoring and/or diagnosing the control network.

Figure 11:
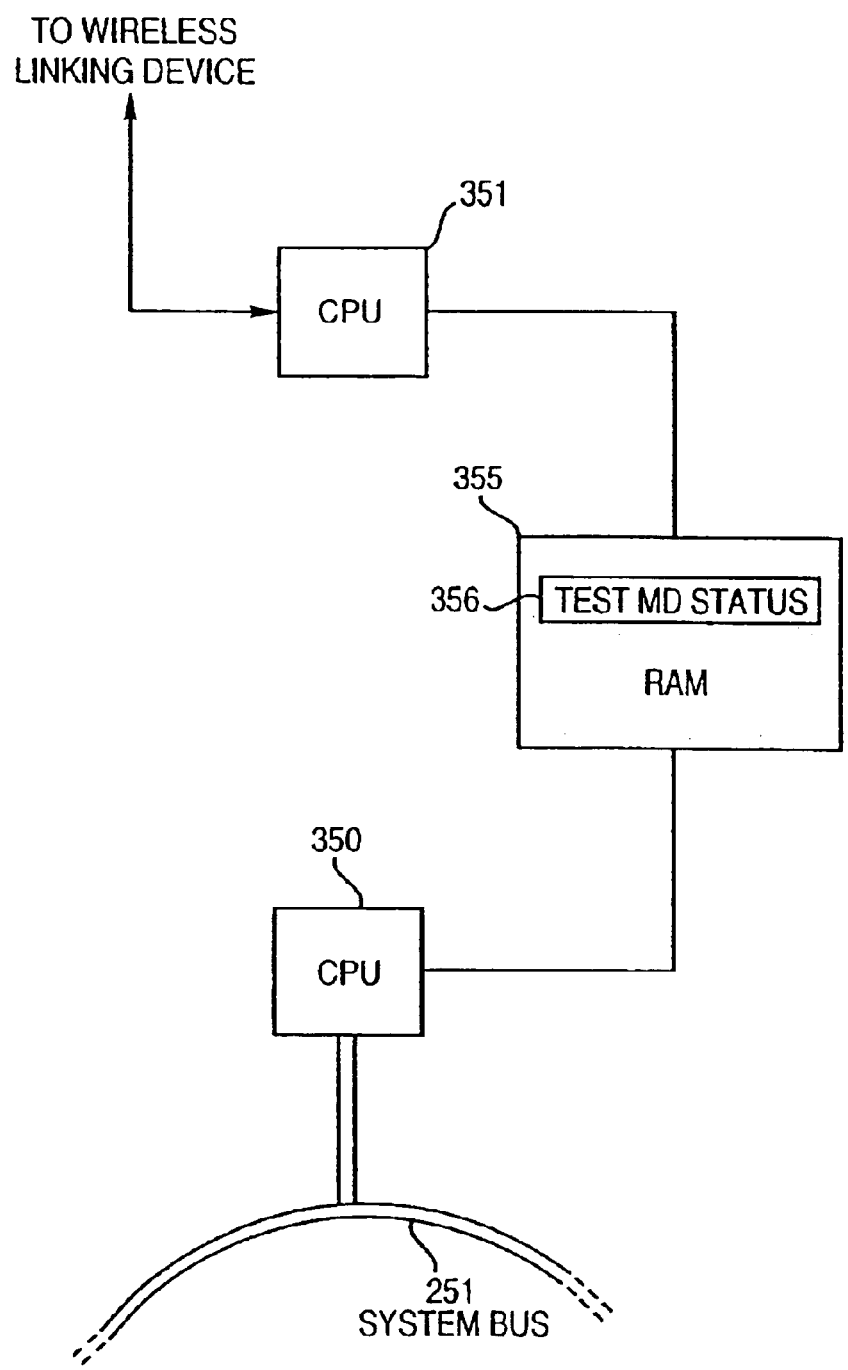
FIG. 11 is a block diagram illustrating an embodiment of a master bus controller having two independent processors.

An example of operation of the computerized diagnostic device 201 may be illustrated with respect to the control system 240 shown in FIG. 7, which, it will be recalled, depicts a hierarchical, master-slave control network 254. In this particular example, the master bus controller (MBC 250) of the control network 254 normally operates in a master mode with respect to the common bus 251, while the other network nodes 252, 255 normally operate in a slave mode with respect to the common bus 251. The master bus controller 250 preferably comprises a pair of independent processors 350, 351, a first processor 350 which connects to the common bus 251, and a second processor 351 which connects to the diagnostic and maintenance port 248, as illustrated in FIG. 11. The first processor 350 acts as a master with respect to the common bus 251, while the second processor 351 acts as a slave (i.e., listener) with respect to the diagnostic and maintenance port connection. Both processors 350, 351 are connected to a dual-port RAM 355, which stores, among other things, a test mode status variable 356 indicating whether the master bus controller 250 is in test mode or not. When a test, diagnosis or other analysis of the control network 254 is desired, the operator initiates the appropriate commands through the computerized diagnostic device (preferably using techniques described later herein), causing a mode switch instruction to be relayed via the wireless intermediary device 243 and wireless diagnostic and maintenance linking device 247 to the master bus controller 250. The mode switch instruction is received by the second processor 351, which interprets the instruction and, in response thereto, switches the test mode status variable 356 to indicate that the master bus controller 250 is now in test mode. The first processor 350 polls the test mode status variable 356 periodically (e.g., once per millisecond), and, when it observes that the state of the test mode status variable 356 has switched, enters the test mode.

Once the test mode is entered, the master bus controller 250 may operate with reduced functionality as compared to its normal monitoring, command and control duties, or may cease performing any monitoring, command and control functions altogether, depending upon how it is programmed and the criticality of those functions. The first processor 350 then continually checks for instructions sent from the computerized diagnostic device 241, which are relayed to it by the second processor 351 and stored in the dual-port RAM 355 in predefined locations. When the first processor 350 receives an instruction when in the test mode, it carries it out and awaits the next instruction. When the test operation is complete (or when the wireless communication link is broken), the second processor 351 returns the test mode status variable 356 to its original (i.e., non-test mode) state. The first processor 350, which continues to poll the test mode status variable 356 when in the test mode, eventually observes that the test mode status variable 356 has returned to its original state, and, in response thereto, resumes its normal monitoring, command and control duties.

A variety of other techniques may be used to cause the master bus controller 250 to respond to instructions from the computerized diagnostic device 241. For example, the master bus controller 250 may comprise only a single processor, and the wireless diagnostic and maintenance linking device 247 may have direct memory access to a test mode status variable stored in the RAM of the master bus controller 250. Alternatively, the master bus controller 250 may receive an interrupt from the wireless diagnostic and maintenance linking device, and may then check a predefined instruction buffer to receive test instructions originating from the computerized diagnostic device 241. A variety of other techniques may also be used. Similar techniques may also be used to initiate test mode operations with any other type of control network (including the control network systems 260 or 280 shown in FIGS. 8 and 9, respectively).

Further functions and features of the computerized diagnostic device 201 will now be described, with particular reference to FIG. 12, which illustrates a preferred such device 201 embodied as a personal digital assistant (PDA) 420, such as a commercially available PalmPilot® or other handheld computer device. While this embodiment is described with respect to a PDA device, it will be understood by those skilled in the art that any other type of device having the same functionality may be substituted for the PDA device.

In a preferred embodiment, the personal digital assistant 420 is based on a platform running Windows CE®, LINUX, or another suitable operating system 424 capable of supporting the operations of a handheld graphical computing device. The personal digital assistant 420 also preferably comprises a communication interface 428, which is used to communicate with the wireless intermediary unit 430 through, for example, a direct wired connection 432 (but alternatively, through a wireless connection 434 such as a radio frequency (RF) or infrared (IR) connection). The personal digital assistant 420 also preferably includes a graphical screen display 422, which may, for example, support a Graphical User Interface (GUI) for allowing user interaction, and further includes one or more application programs 426 which provide the programming instructions for executing a variety of the test and diagnostic functions programmed into the personal digital assistant 420.

Some of the test and diagnostic functions that may be included are as follows. The personal digital assistant 420 may allow the user to view various aspects of the control network graphically on the screen display 422. The displayed images may include, for example, illustrations of all or part of the control network within the context of the controlled facility (e.g., a building, vehicle, plant, robot, machine or other facility), so as to facilitate the user's testing, monitoring and/or diagnosis of the control network. The image of the facility may be presented on the screen display 422 in a faint outline or phantom format, while the control network may appear in solid, dark lines, thus allowing the user to easily distinguish the facility from the components of the control network being observed or tested.

The personal digital assistant 420 may also provide the ability for an operator to force individual components in the control network system to a desired output state. By entering various inputs, the operator may cause test instructions to be conveyed wirelessly from the personal digital assistant 420 to the control network 218, whereupon the test instructions are relayed to the appropriate individual component(s) of the control network system. In the absence of any fault of component failure, the component should change states to the desired output state in response to receiving the proper instruction. The personal digital assistant 420 may be programmed to receive feedback from the control network 218 over the wireless connection, and to display (in a ladder format, e.g.) the states of the relevant switches, actuators or relays along the signal path to the network component being tested or observed. The personal digital assistant 420 may be programmed with information pertaining to the locations of various network components in the control network 218 and their connectivity, thereby simplifying diagnosis or testing by the operator, and reducing or eliminating the need for the operator to carry and interpret bulky, cumbersome manuals and circuit blueprints.

The personal digital assistant 420 may also provide an automated procedure for testing the connection between it and the wireless intermediary device 205 (or 430 in FIG. 12), and another automated procedure for testing the wireless connection between the wireless intermediary device 205 and the control network 218.

Details of the above functions, and additional test and diagnostic functions, are provided below.

Figure 12:
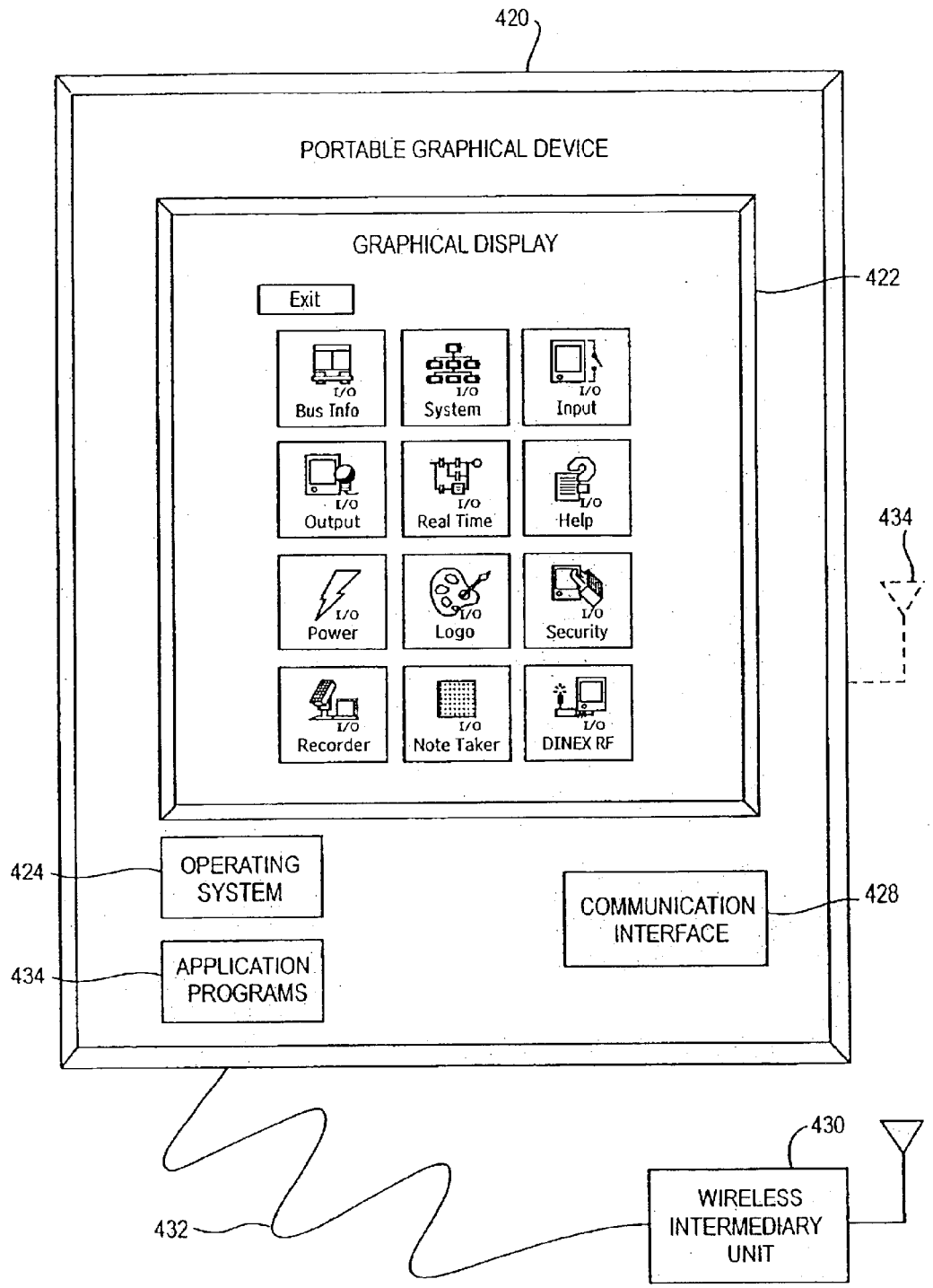
FIG. 12 is a diagram of a preferred handheld, computerized diagnostic device embodied as a personal digital assistant.
Figure 22:
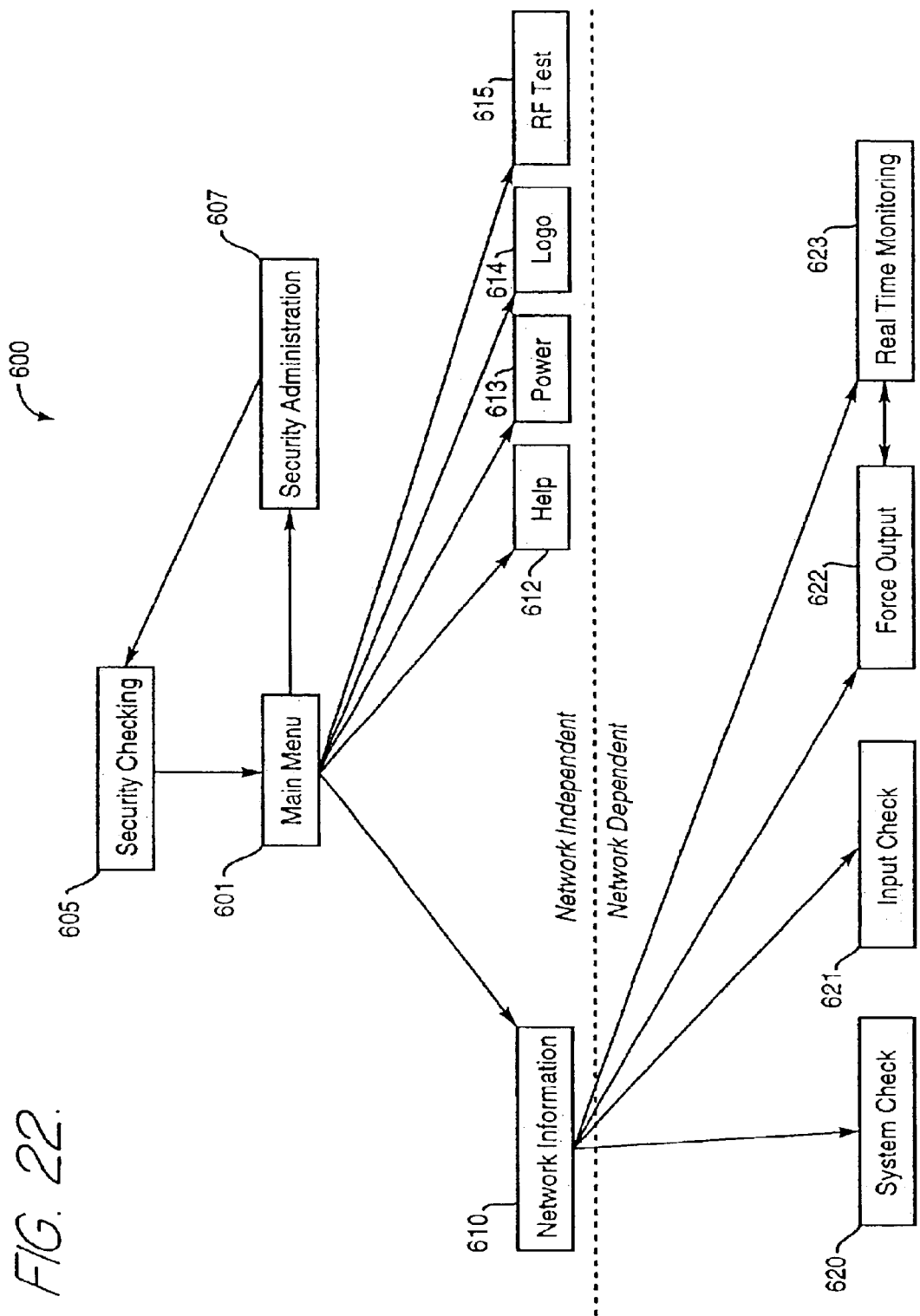
FIG. 22 is a software architecture diagram as may be used in the computerized diagnostic device illustrated in FIG. 12.

FIG. 22 is a diagram of a preferred software system architecture as may be used in the computerized diagnostic device illustrated in FIG. 12. As illustrated in FIG. 22, the software system architecture 600 comprises a security checking function 605, a main menu function 601, and a security administration function 607, which preferably (but need not) collectively comprise a software loop as illustrated. The main menu function 607 calls any of a number of subsidiary functions, including a network information function 610, a help function 612, a power function 613, a logo function 614 and an RF test function 615. All of the foregoing functions 601, 605, 607, 610, 612, 613, 614 and 615 may be viewed as "network independent" in the sense that they do not depend upon the nature of the control network being tested or diagnosed. The network information function 610 in turn accesses a variety of additional subsidiary functions, including a system check function 620, an input check function 621, a force output function 622, and a real-time monitoring function 623. These latter functions 620, 621, 622 and 623 may be viewed as "network dependent" in certain aspects because they may depend or can be optimized for particular network configurations, types or implementations. Further details regarding the software functions appearing in FIG. 22 will be described or become apparent in the discussion of the test and diagnostic functions of the personal digital assistant 420.

Figure 15:
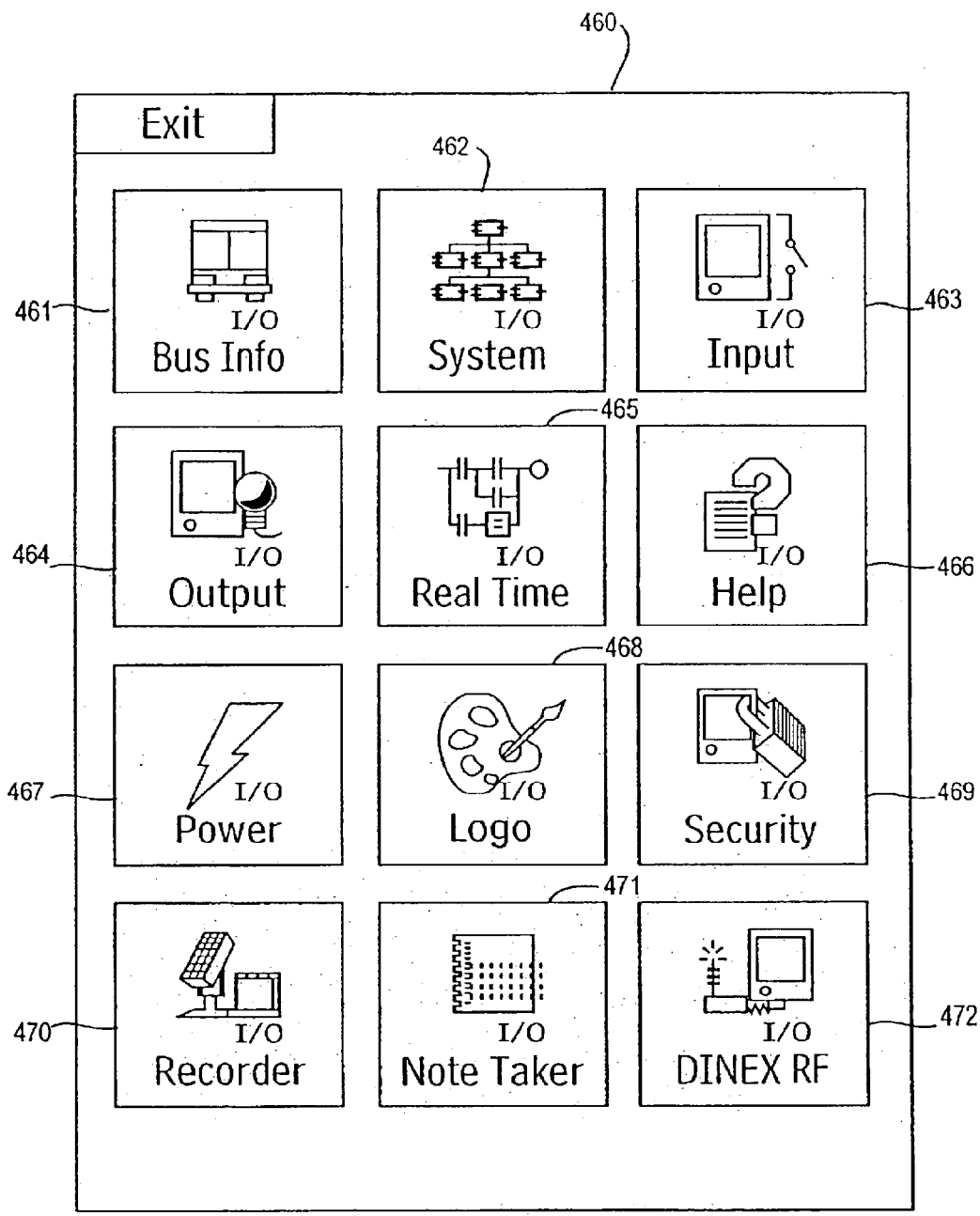
FIG. 15 is an example screen image of a main menu as may be used, for example, in the computerized diagnostic device illustrated in FIG. 12.

A diagnostic system menu screen 460, as illustrated in FIG. 15, preferably allows a user to initiate various test and diagnostic functions relating to the control network 218, as well as to perform various software system administrative functions. The test and diagnosis application software may have pre-programmed security functions designed to prevent unauthorized access to the diagnostic system main menu 460. Examples of security features are described below.

Figure 16:
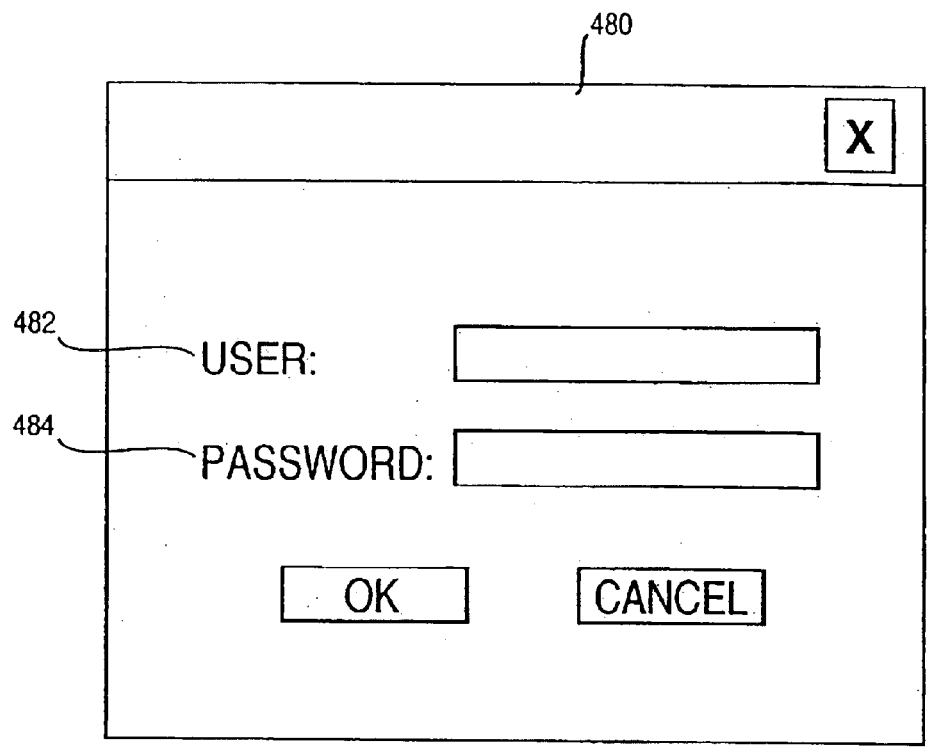
FIG. 16 is an example of a logon screen as may be used, for example, in the computerized diagnostic device illustrated in FIG. 12.

In a preferred embodiment, the security checking function 605 of the personal digital assistant 420 is invoked during initial user access, and also may be accessed via user selection of a security function icon from a diagnostic system main menu (see FIG. 15). The application program relating to the test and diagnosis features of the personal digital assistant 420 may be launched according to any acceptable procedure provided by the operating system 424, and is conveniently accomplished by user selection of an icon relating to the control network test and diagnosis application software. When a user initially launches the control network test and diagnosis application software, or when the personal digital assistant 420 is powered on with the diagnostic system main menu 460 running, a logon screen 480, as illustrated in FIG. 16, is preferably displayed, prompting the user to enter a logon identification (ID) string in a user ID field 482 and password in a password field 484 in order to gain operational access to the control network test and diagnosis application software. The security checking function 605 then attempts to verify the logon ID string and password. If the security checking function 605 is able to verify the logon ID and password, the user is then allowed to access the screen displaying the diagnostic system main menu 460, including the associated test and diagnostic system functions. An example of a diagnostic system main menu is illustrated in FIG. 15. If the user's logon ID and password cannot be verified, the user is denied access to the features provided by the test and diagnosis application software. Preferably, the security checking function 605 also continuously monitors each individual user's activity, and logs off any user who has been inactive for a predetermined period of time. This automatic log-off timeout function reduces the likelihood that an unauthorized person can access the test and diagnostic application software by using a personal digital assistant 420 which has not been properly logged off.

A variety of icons 461 through 472 are shown in the exemplary diagnostic system main menu 460 illustrated in FIG. 15. Rather than icons, textual strings may be displayed, listing the various available functions. The icons 461 through 472, however, are convenient from a user standpoint, and may be selected by, for example, a wand device, user contact (if a touch screen), pressing an appropriate keyboard key (for example, entering the first letter(s) of the desired function, or using the arrow keys to the appropriate icon and pressing enter), vocalizing the desired input (if a microphone and speech recognition software are provided), or by any other selection means provided within the functionality of the personal digital assistant 420. The precise manner of selecting the various icons or functions of the test and diagnosis application software is not important to the overall operation of the invention in its various embodiments as described herein.

A user may invoke various security functions by selecting the Security icon 469 from the system main menu 460, shown in FIG. 15. If a user has privileges associated with a system administrator, then selecting the Security icon 469 from the main menu 460 may enable the user to perform various system administration functions, such as, for example, adding a new user ID and password, deleting a user ID, or modifying an existing user's password 484. If the user logs on using a standard user logon ID (as opposed to a system administrator user ID), selecting the Security icon 469 from the main menu 460 may enable the user to perform certain system administrative functions unique to that individual, such as, for example, modifying his or her existing password 484.

The diagnostic system main menu 460 illustrated in FIG. 15 is particularly tailored, in this example, to the transit vehicle industry, but may be tailored to any industry, or else may be made generic. In this particular embodiment, however, a bus (i.e., transit vehicle) information icon 461 is provided as part of the diagnostic system main menu 460. Alternatively, the bus information icon 461 may be replaced by a control network information icon, to make its functionality more generic. A primary purpose of the bus information icon 461 is to allow the user to identify which transit vehicle (i.e., bus) type will be tested and/or diagnosed, and, further, which specific transit vehicle within that transit vehicle type will be tested and/or diagnosed.

Figure 17:
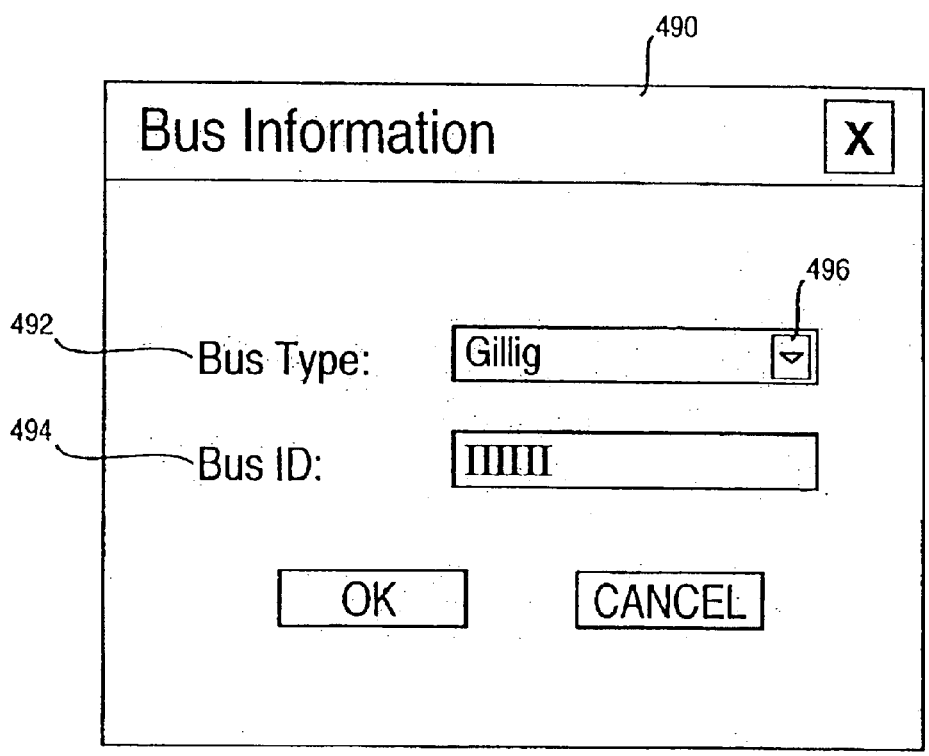
FIG. 17 is an example of a bus information input screen as may be used, for example, in the computerized diagnostic device illustrated in FIG. 12.

When the user selects the bus information icon 461 from the diagnostic system main menu 460, a bus information input screen 490 is preferably displayed, as illustrated in FIG. 17. The user may then enter a transit vehicle type (or control network type, more generically) in a transit vehicle type field 492, and a transit vehicle identification (ID) number (or control network ID, more generically) in a transit vehicle ID field 494, which identifies the particular vehicle (or other structure or facility) to be serviced. The transit vehicle type 492 may be entered by the user (using a numeric keypad in connection with a wand, for example), or alternatively may be selected from a drop down menu (invoked by selecting a drop down menu button 496) listing available transit vehicle types. For any given transit vehicle type, many individual transit vehicles may exist. Entry of a unique transit vehicle ID in the transit vehicle ID field 494 identifies the specific vehicle to be serviced. The network information function 610 (see FIG. 22) preferably manages the foregoing transit vehicle or control network information functions. It preferably responds to the entry or modification of the transit vehicle ID by verifying that the specified vehicle exists (i.e., is recognized by the test and diagnosis application software) and that a communications connection to that vehicle can be established.

In a preferred embodiment, when the user has selected the specific transit vehicle ID and it has been recognized by the network information function 610, the personal digital assistant 420 attempts to communicate with the control network 218 of the selected transit vehicle through establishment of a wireless connection by the wireless intermediary unit 205 (or 430, as depicted in FIG. 12). If the control network 218 of the specified transit vehicle does not respond to the wireless intermediary unit 205 (or 430), then an error message may be displayed on the screen image of the personal digital assistant 420, indicating a communications link failure. Such a failure may be caused by a variety of circumstances, including, for example, that 1) the specified transit vehicle is not within range of the wireless intermediary unit 205 (possibly because an incorrect transit vehicle ID is entered), or 2) the communications link itself failed due to mechanical malfunction.

If the specified transit vehicle (or control network) type and transit vehicle (or control network) ID are verified by the network information function 610, and, optionally, if a communications link is established to the control network 218, the network information function 610 may then ensure that the relevant transit vehicle (or control network) information is available to the personal digital assistant 420. For example, the network information function 610 may examine a data storage component (such as an internal ROM/PROM/EEPROM chip or memory card, a CD-ROM, an insertable memory cartridge, or a disk, to name a few examples) to determine whether the relevant transit vehicle (or control network) information is available. The data storage component may store information relating to a single transit vehicle (or control network), or multiple transit vehicles (or control networks). If the information pertaining to the selected transit vehicle (or control network) is not found on the data storage component, then the network information function 610 may cause a message to be displayed on the display screen 422 requesting the user to insert or otherwise provide the necessary data storage component (i.e., "Please insert the memory cartridge for the Alpha bus"). Alternatively, the user may download such information from a host computer (not shown). As yet another alternative, the personal digital assistant 420 may attempt to automatically download the control network information from a remote host computer. To this end, the personal digital assistant 420 may be configured with its own wireless communication interface through which it makes a connection to a remote host computer at which the relevant control network information is stored. As a variation of this technique, the wireless intermediary device 205 (or 430) may be provided with means for establishing a separate wireless communication link to a remote host computer at which the relevant control network information is stored.

Assuming the transit vehicle (or control network) information is available to the personal digital assistant 420, the personal digital assistant 420 returns to the main menu function 601 and displays the diagnostic system main menu 460 for the user to select desired diagnostic functions to be performed on the vehicle.

Figure 14:
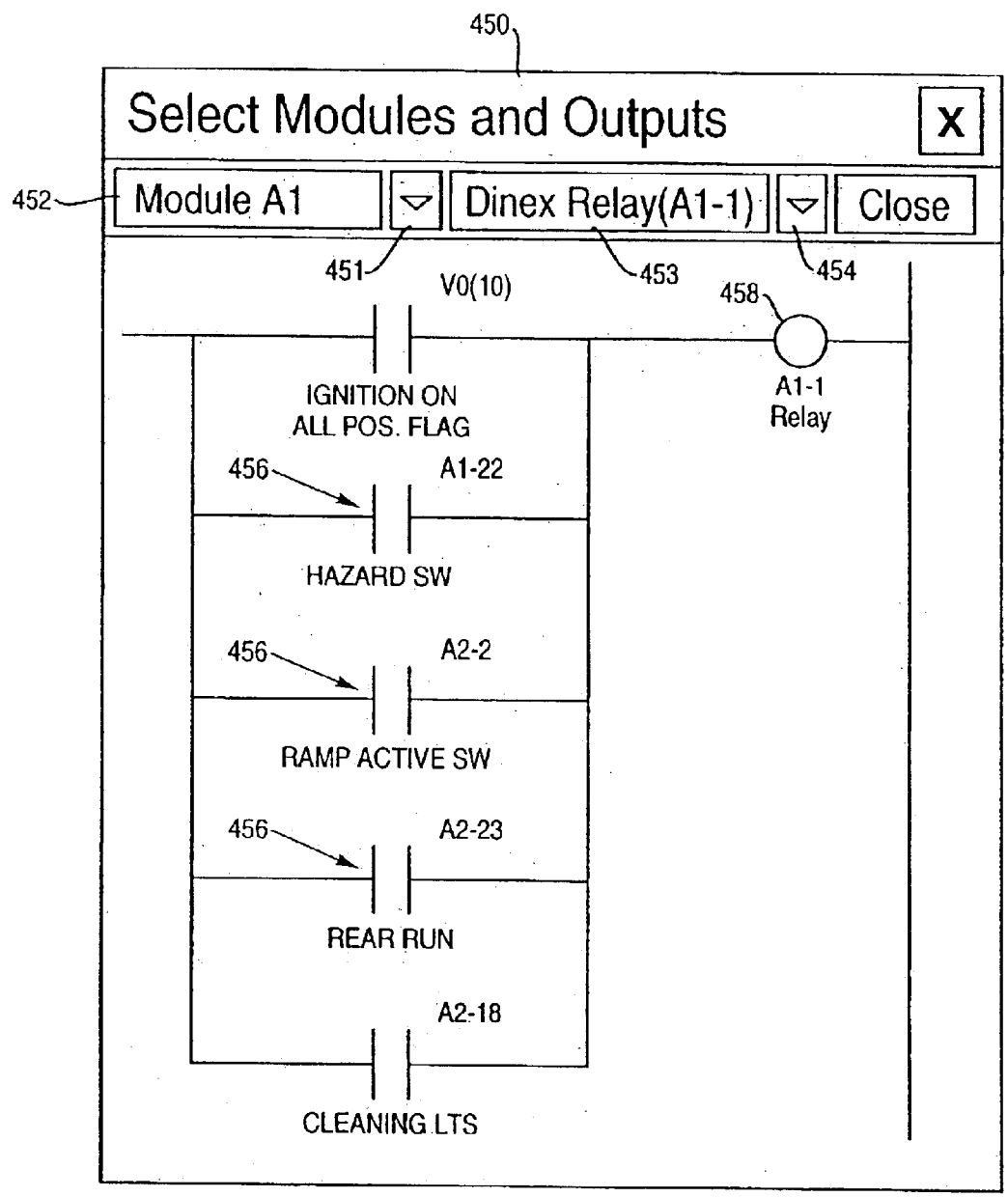
FIG. 14 is an example of a screen image depicting various control network components illustrated in a logic ladder format.

Once the control network (e.g., transit vehicle) type and specific ID are selected, the user may thereafter perform a variety of test or diagnostic activities utilizing the personal digital assistant 420. In a preferred embodiment, selection of a system check icon 462 allows the user to graphically observe a diagram of the control network 218, preferably within the context of the associated transit vehicle or other facility (e.g., building, plant, robot, etc.). In a preferred embodiment, in response to selection of the system check icon 462, and as illustrated in FIG. 14, some or all of the network nodes 442 of the control network 218 are graphically displayed on screen display 422 of the personal digital assistant 420 in dark, solid lines, superimposed on a three-dimensional (3-D) transparent or phantom outline image 440 of the transit vehicle (or other structure or facility which houses the control network 218). Each of the network nodes 442 in the control network may be numbered or otherwise designated with a unique identifier (e.g., A1, A2, B1 and so on) for identification by the user. Graphical display in this manner assists the user in identifying and locating various network nodes of the control network 218, by showing their relative positions within the image 440-of the transit vehicle (or other facility).

The graphical information relating to the image 440 and the network nodes 442 is preferably stored on (or downloaded to) a data storage component within the personal digital assistant 420. As noted previously, this information may be stored in ROM, PROM, EEPROM, CD-ROM, memory cartridge, or any other data storage means accessible to the personal digital assistant 420. In a preferred embodiment, sufficient graphical information is provided such that the image 440 of the transit vehicle (or other facility) is fully rotatable, thus allowing the user to change the view to correspond to wherever the user happens to be positioned in relation to the vehicle. The user may be allowed, in some applications, to zoom in or out of the screen image. Likewise, alternative view might be provided, such as an internal view versus an external view, and the user may be provided with means to select a particular view.

Selection of the system check icon 462 by the user may also result in a diagnostic test being initiated by the system check function 620 (see FIG. 22) of the application software running on the personal digital assistant 420. For example, each of the network nodes 442 in the control network may be systematically tested by the control network, according to an instruction relayed from the personal digital assistant 420 to the control network 218 over the wireless communication channel via the wireless intermediary device 205. This diagnostic test may run in a continuous loop until terminated by the user by hitting, for example, an Exit button 443. Control nodes 442 identified as malfunctioning during this diagnostic analysis may be illustrated on the screen display 422 in a distinguishable manner from properly functioning control nodes 442. This can be accomplished in various ways, such as by shading the malfunctioning control nodes 442 in a color different than the normally operating control nodes 442, or by causing the malfunctioning control nodes 442 to blink on the graphical display 422, or by any other visual or graphical means. Detection of a malfunctioning control node 442 during system check may also result in display of an error message on the personal digital assistant 420 alerting the user of the problem. Once a malfunctioning control node 442 is serviced or replaced, the displayed error message is cleared, and the nature of the network node image returns to its original display state.

While the image 440 of the transit vehicle or other facility is preferably displayed transparently and in 3-D, in various applications this type of graphical display may not be necessary or desired. Therefore, the image 440 being displayed may be a schematic diagram, or a two-dimensional image, if desired.

Figure 13:
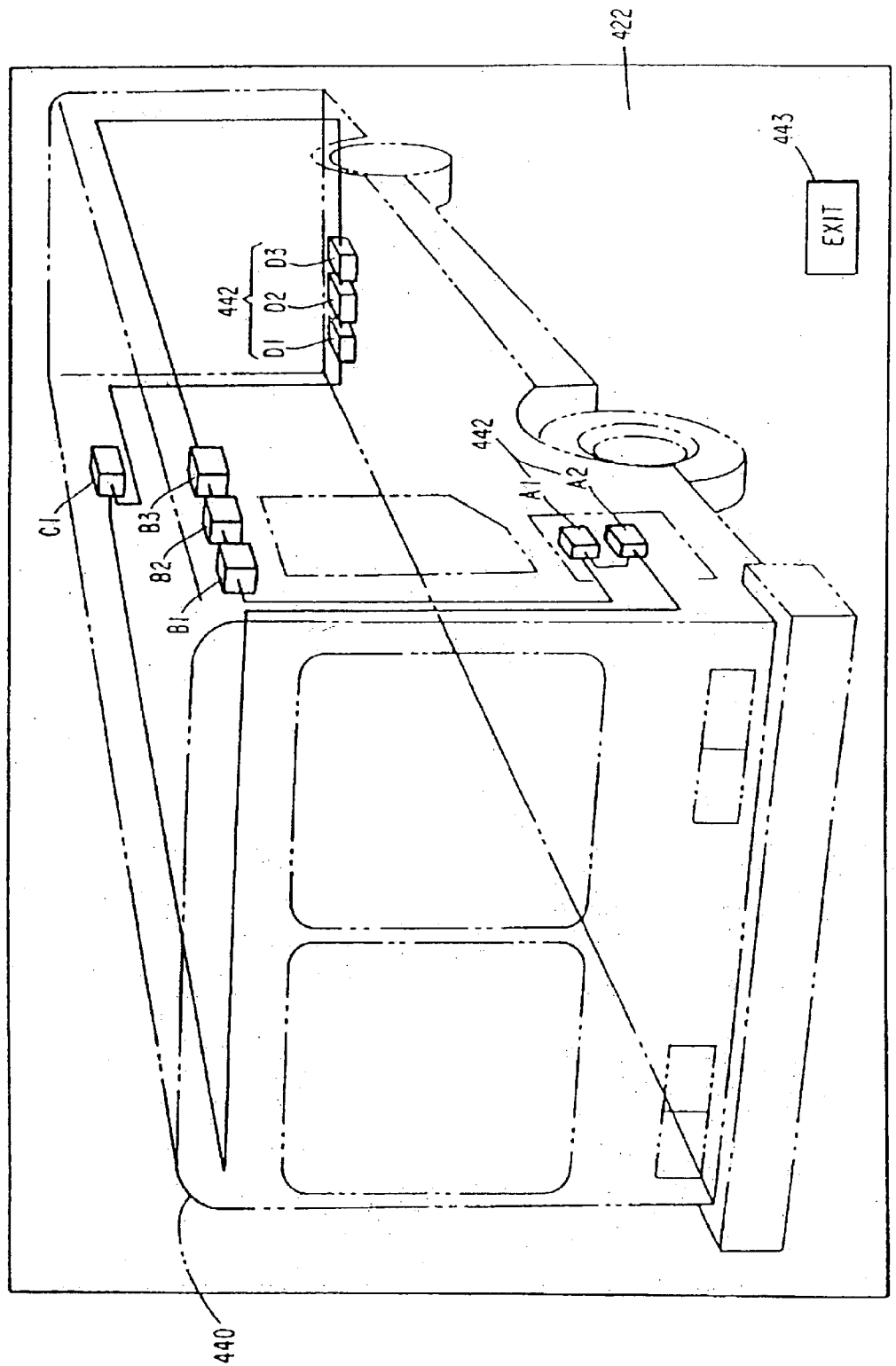
FIG. 13 is an example of a screen image depicting a vehicle outline in relation to control network nodes and other features.

As further illustrated in FIG. 13, the image display software utilized in connection with the check system function 620 also preferably allows a-text layer (such as "A1", "A2", "B1", etc.) to be superimposed on the image 440 appearing on the screen display 422. The text overlay may be used to provide identifying information for the various network nodes 442, or to provide other information to the user.

Figure 18:
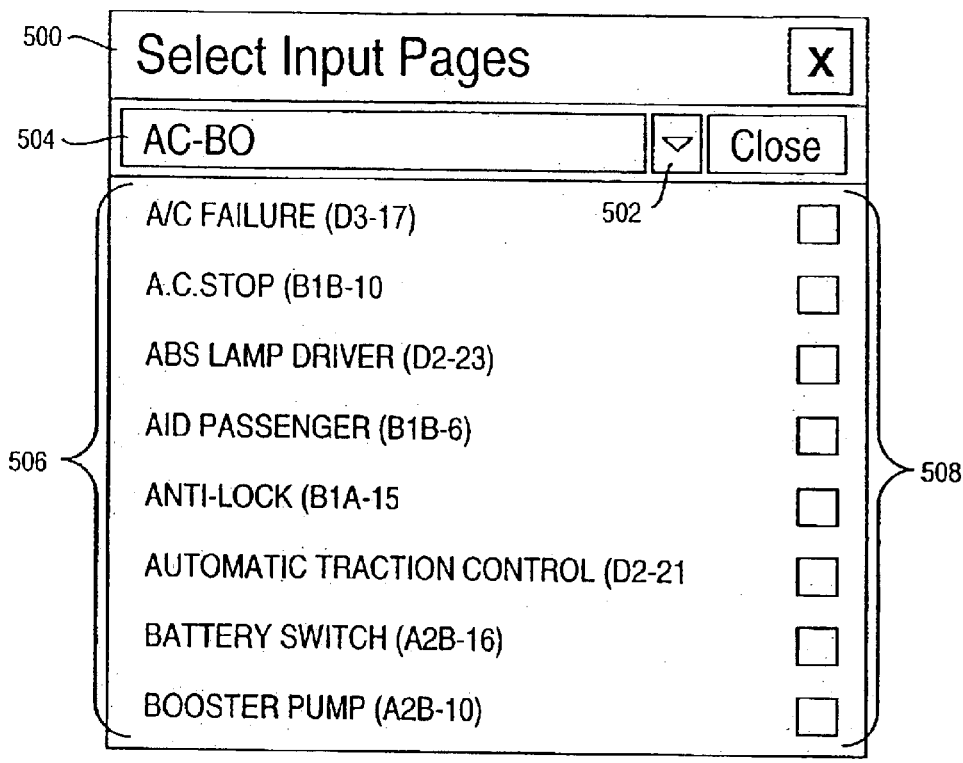
FIG. 18 is an example of an input check select screen as may be used, for example, in the computerized diagnostic device illustrated in FIG. 12.

Other additional functions preferably provided by the application software run on the personal digital assistant 420 will now be described. Returning to FIG. 15, user selection of the Input Check icon 463 on the system main menu 460 causes the display of an input check select screen 500 (as illustrated in FIG. 18) on the screen display 422. The input check select screen 500 may comprise one or more pages associated with each network node, listing all of the testable input switches, actuators, relays, or other components associated with the network node. In a preferred embodiment, a drop down menu 504 is available at the activation of a drop down menu button 502, that lists all of the available network nodes of the control network 218. Using the drop down menu 504, the user selects a particular network node (e.g., "AC-BO") to be tested. Selection of a network node from the drop down menu 504 results in one or more pages appearing on the input select display screen 500 listing all testable input components 506 associated with the selected network node. The user then indicates the input components 506 to be tested by selecting the corresponding check box(es) 508 on the page of the input check select screen 500.

In response to selection of the check boxes 508 for the desired input components 506 to be tested, the application software of the personal digital assistant 420 issues commands to the control network 218 (over the wireless communication link, via the wireless intermediary device 205) to check the status of the selected input components 506. Upon receiving a response from the control network 218, the input check function 621 of the application software highlights or otherwise identifies any malfunctioning input components 506 visually on the input check select screen 500. The operator then may replace the indicated defective input components 506, or otherwise locate the fault or cause of failure, to repair the malfunction. Remote testing of control network inputs 506 in this manner is useful to the operator because often components 506 are located in hard to access places, particularly in the context of transit vehicles, as well as in many other applications. The drop down menu 504 on the input check select screen 500 is also useful to the user as a directory to determine the names of input components 506 and network nodes of the control network 218.

Figure 19:
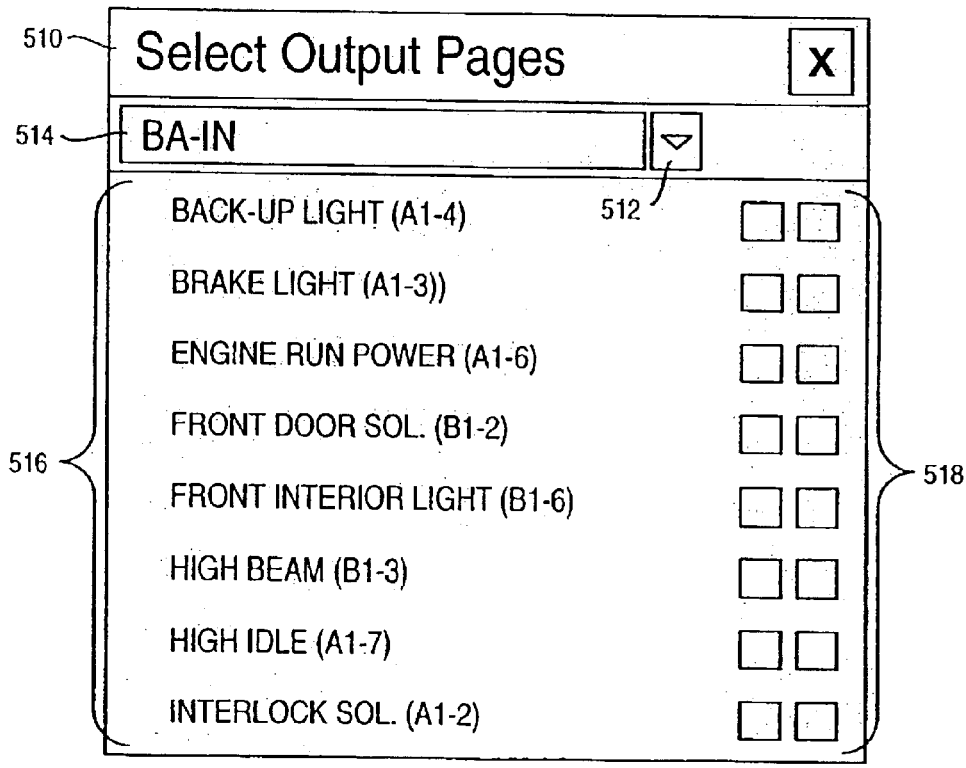
FIG. 19 is an example of an output check select screen as may be used, for example, in the computerized diagnostic device illustrated in FIG. 12.

Returning once again to FIG. 15, user selection of the Output Check icon 464 on the system main menu 460 results in a very similar sequence of events, and, initially, causes the display of an output check select screen 510 (as illustrated in FIG. 19) on the screen display 422. The output check select screen 510 may comprise one or more pages associated with each network node, listing all of the testable output switches, actuators, relays, or other components associated with the network node. In a preferred embodiment, a drop down menu 514 is available at the activation of a drop down menu button 512, that lists all of the available network nodes of the control network 218. Using the drop down menu 514, the user selects a particular network node (e.g., "BA-IN") to be tested. Selection of a network node from the drop down menu 514 results in one or more pages appearing on the input select display screen 510 listing all testable output components 516 associated with the selected network node. The user then indicates the output components 516 to be tested by selecting the corresponding check box(es) 518 from the first column of check boxes on the page of the input check select screen 510.

In response to selection of the check boxes 518 for the desired output components 516 to be tested, the application software of the personal digital assistant 420 issues commands to the control network 218 (over the wireless communication link, via the wireless intermediary device 205) to activate all necessary input components (e.g., switches) to force the selected output function. The application software of the personal digital assistant 420 then issues commands to the control network 218 (again over the wireless communication link, via the wireless intermediary device 205) to check the status of the selected output components 516. Upon receiving a response from the control network 218, the output check function 622 of the application software highlights or otherwise identifies any malfunctioning output components 516 visually on the output check select screen 510. The operator then may replace the indicated defective output components 516, or otherwise locate the fault or cause of failure, to repair the malfunction. As with the Input Check function, the Output Check function provides the benefit of remote testing, which is very convenient for operational personnel. Further, the drop down menu 514 on the output check select screen 510 is also useful to the user as a directory to determine the names of output components 506 and network nodes of the control network 218.

In the case of output state failure, the Output Check function of the application software running on the personal digital assistant 420 allows interactive real time monitoring of the output functions 516. The real time monitoring function is activated by the user selecting the appropriate check box(es) 518 in the second column on the output check select screen 510 corresponding to the failed output 516. Real time monitoring can also be selected directly from the diagnostic system main menu screen 460 shown in FIG. 15.

Figure 23:
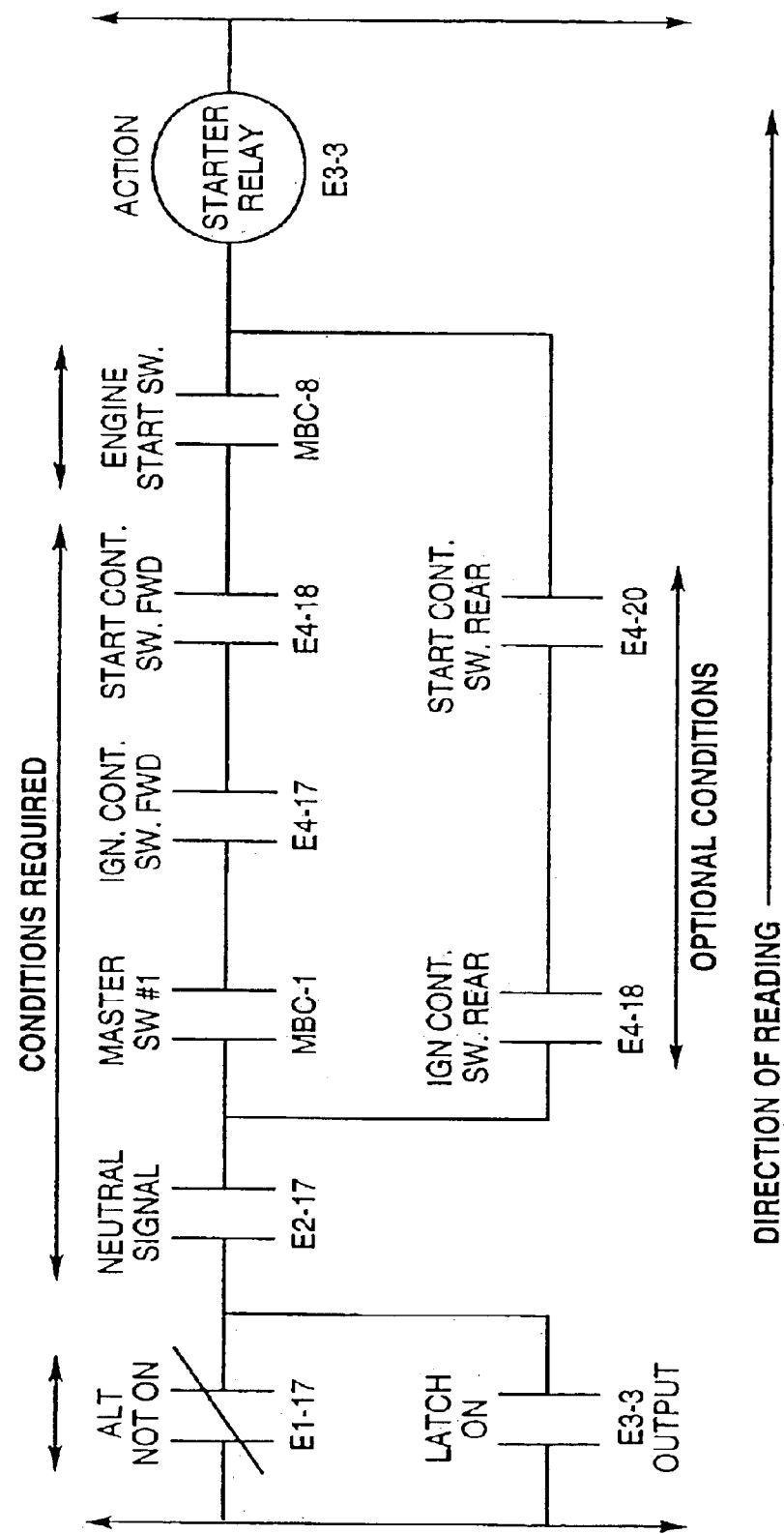
FIG. 23 is an example of a logic ladder chart.

In a preferred embodiment, the real time monitoring feature of the personal digital assistant 420 preferably provides the ability to display a graphic, visual diagram, in "logic ladder" format, of the on/off states of selected control network components. Although many different formats could be chosen, a logic ladder format is particularly useful for diagnostic and maintenance personnel. FIG. 23 is an example of a logic ladder chart, showing various conditions that are required to activate a starter relay ("E3-3"). Such conditions, in this example, include at least the following: (1) alternator is not charging; (2) vehicle is in neutral; and either (3) the master switch is on, the ignition and starter controller switches are set in front start positions, and the starter button is on; or (4) the rear ignition and starter switches are set in start position.

FIG. 14 shows a real time monitoring screen 450 displayed by the application software running on the personal digital assistant 420 in response to selection of the Real Time Monitoring function. The real time monitoring screen 450 preferably displays a set of input elements 456 (i.e., conditions) and the corresponding system output 458, in a logic ladder format. In this embodiment, the input elements 456 of the circuit are highlighted to illustrate that the element is operating properly. This function allows real time monitoring of input components and output components within the control network 218.

In a preferred embodiment, a control module drop down menu 452 is available by selecting a drop down menu button

451, providing a list of all network nodes of the control network 218. The user may thereby select a particular network node for diagnostic testing. When a network node is selected, a network node output drop down menu 453 is displayed, providing a list of all system outputs for the selected network node. The user may then scroll through the list and select a particular system output to be tested using the real time monitoring function.

In a preferred embodiment, the real time monitoring function displays a graphical diagram of the logic ladder format diagram including all input elements 456 (i.e., conditions) required to activate the selected output 458, displayed as symbols on the real time monitoring screen 450. From the logic ladder diagram, the user then may individually select each input element 456 to perform real time diagnostic testing of each input element 456. If the element is functioning properly, then its corresponding symbol on the real time monitoring screen 450 illuminates or becomes otherwise visually distinguished. If the switch is defective, it will not illuminate or becomes otherwise visually distinguished in a manner indicated that it is not operating. This function allows fast and convenient real time diagnostic monitoring of a complete circuit, from the input elements 456 to the system output 458, in all possible input combinations.

Figure 24:
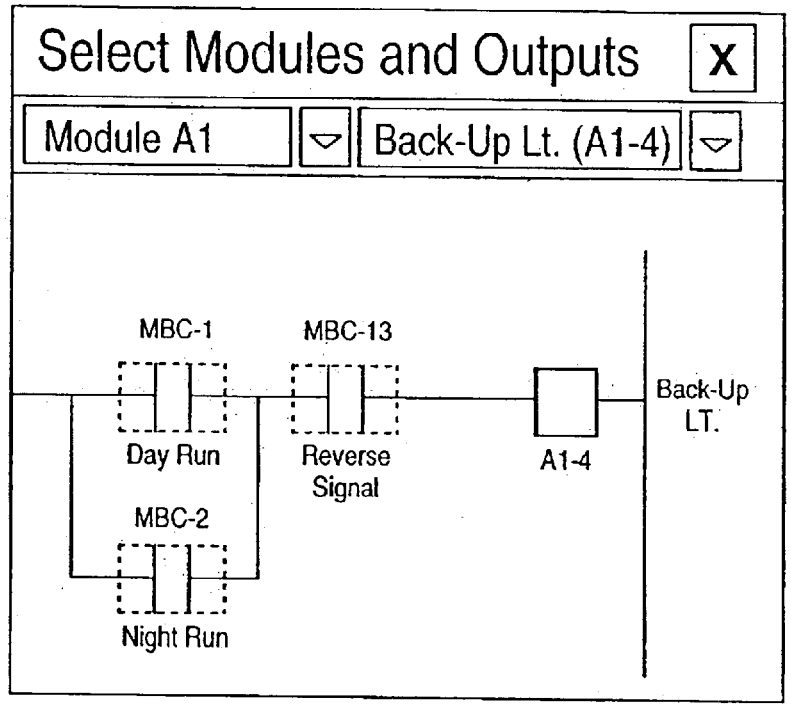
FIGS. 24, 25 and 26 are screen images illustrating activation of certain control network components depicted graphically in a logic ladder format.
Figure 25:
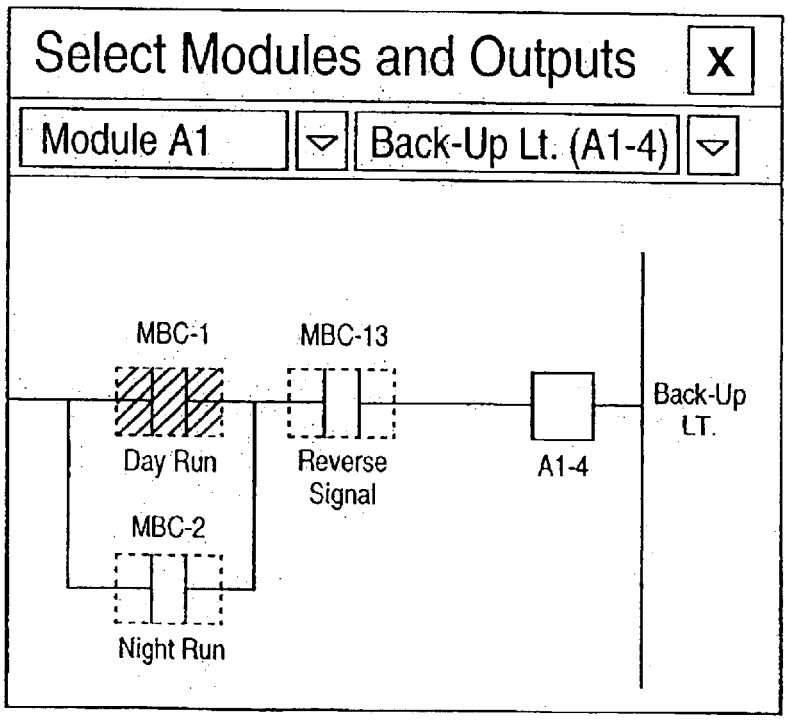
Figure 26:
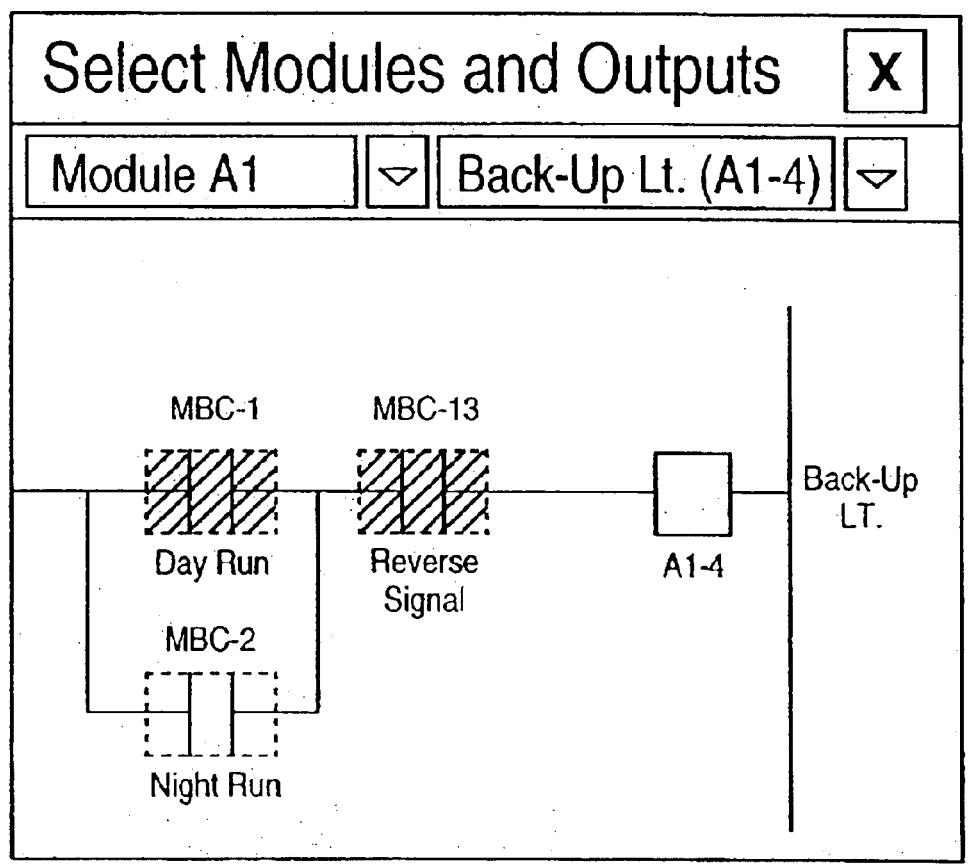
Figure 27:
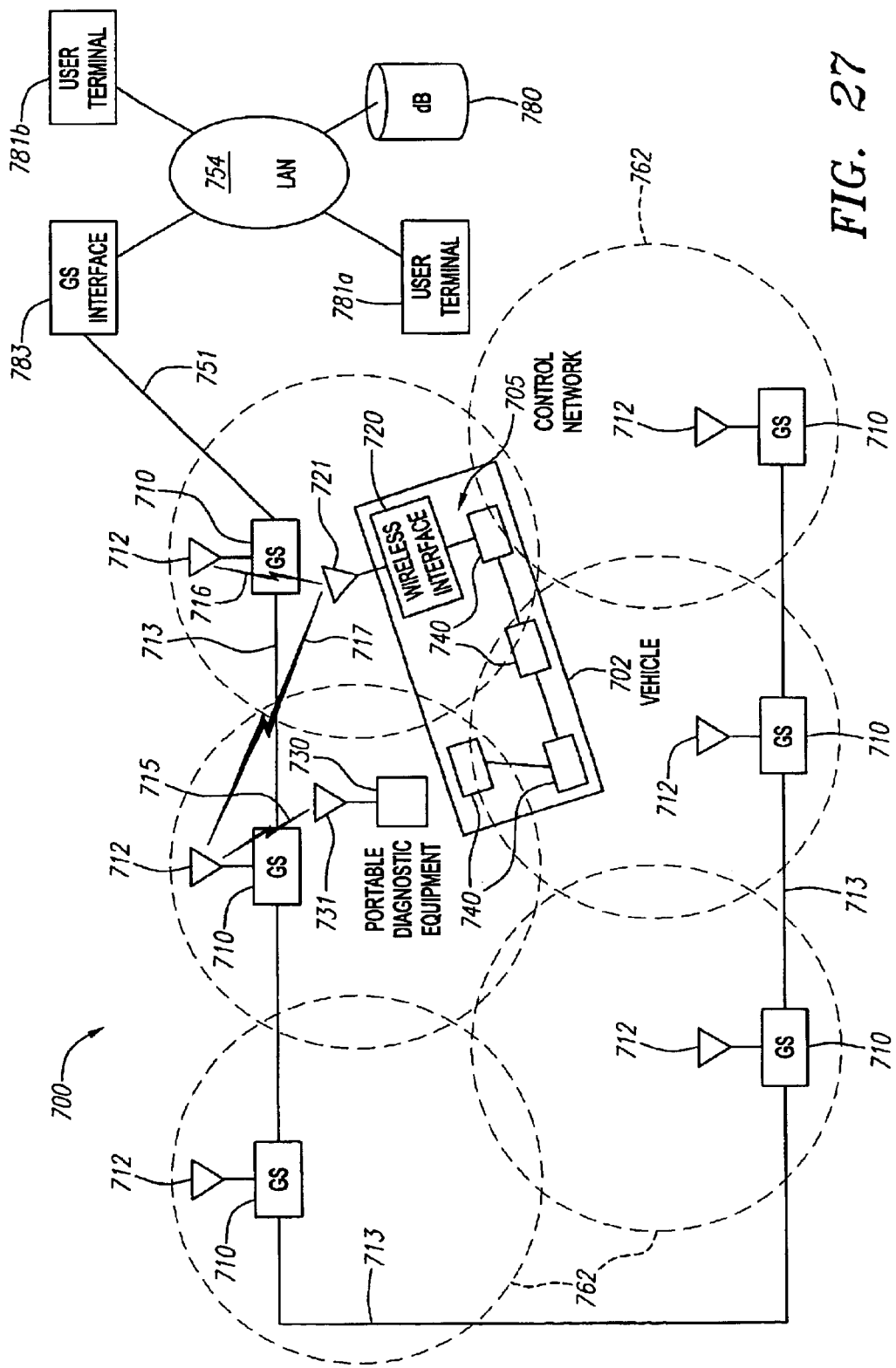
Figure 28:
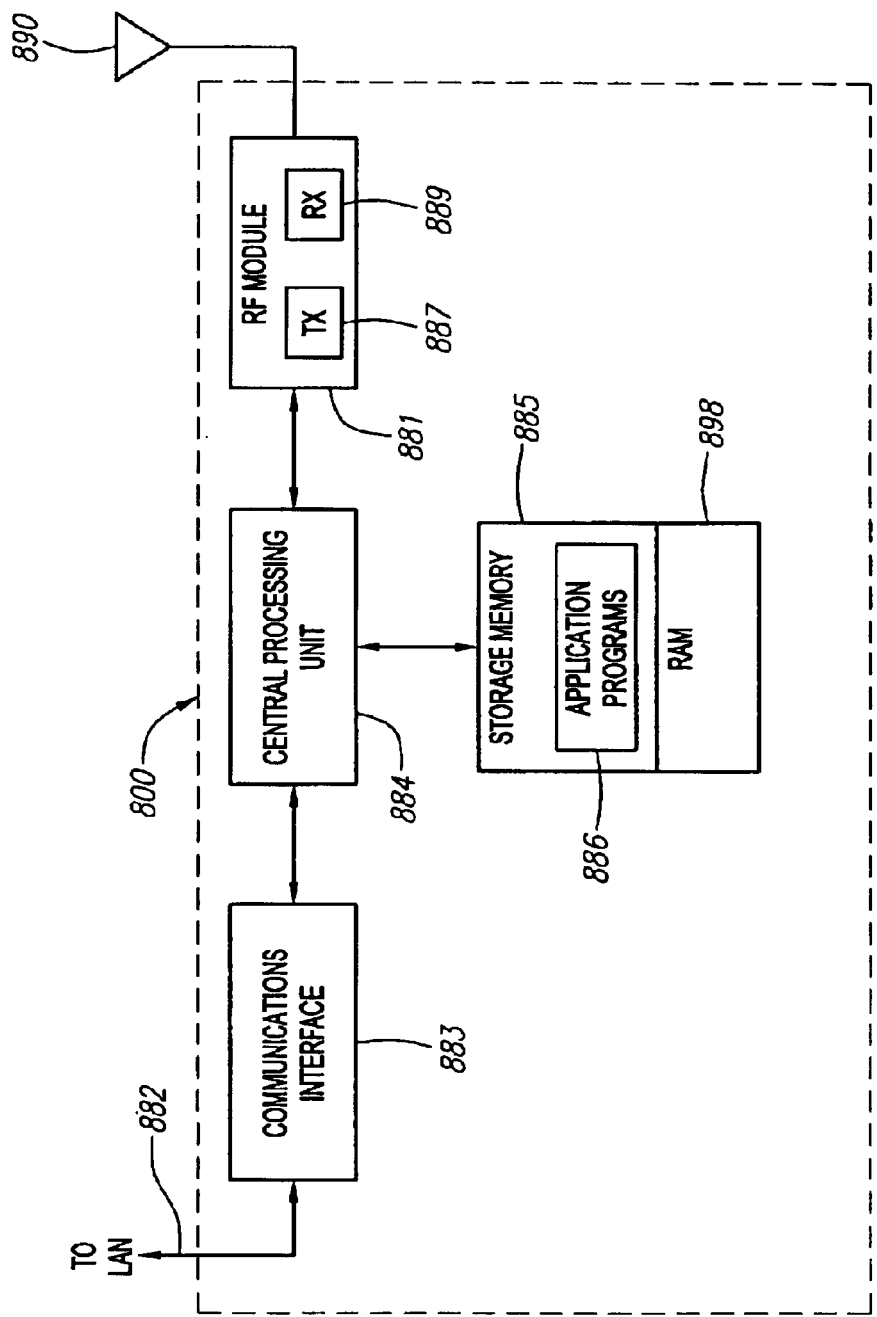

FIGS. 24, 25 and 26 show examples of screen images illustrating activation of certain input elements depicted symbolically within a logic ladder format, eventually leading to activation of an output component (i.e., back-up light). In FIG. 24, the initial logic ladder diagram is illustrated for the user on the screen display 422. The user then may select the first input element or switch ("MBC-1"), causing it to become visually distinguishable, as illustrated in FIG. 25 (in this particular example, it becomes shaded, but it can as easily be illuminated or color coded as well). Then, the user may select the second input element or switch ("MBC-13"), causing it to become visually distinguishable, as illustrated in FIG. 26. When the inputs have been so activated, the output state of the output component (i.e., backup light) can be checked.

To carry out the Real Time Monitoring function, as each input element is selected by the user, the application software sends the appropriate commands across the wireless connection (via the wireless intermediary device 205 or 430) to the control network 218, which responds by activating the appropriate switch or component. The control network 218 can send a response to the personal digital assistant 420 as each switch or component is activated, or else the application software can periodically poll the status registers at the control network to determine when the switch or component has activated or reached its desired state.

As noted, the real time monitoring select function may be invoked for a particular system output by selecting the check box 518 (in the second column) for the output 458 on the output check select screen 510, shown in FIG. 19. In response to selection of one or more real time monitoring options using the check boxes 518, the application software automatically displays the real time monitoring select screen 450 on the screen display 422 of the personal digital assistant 420, with the corresponding logic ladder diagram (i.e. switch hierarchy) for the selected system output 458. When multiple system outputs 458 are selected, the application software may rotate through the corresponding logic ladder diagrams sequentially, or may allow the user to scroll through them until the desired screen is found. Allowing direct access from the Output Check function to the Real Time Monitoring function eliminates the need for a user to select the network node and system output 453 each time on the Real Time Monitoring select screen 450, thereby increasing the efficiency of testing multiple system outputs 458 and their corresponding input elements 456.

Returning once again to FIG. 15, user selection of the RF Test icon 472 (or communication link test icon) on the diagnostic system main menu 460 displays an RF test screen on the personal digital assistant 420. An example of a preferred RF test screen 520 is shown in FIG. 20. The RF test screen 520 preferably activates an RF test function, which verifies the integrity of the connection both between the personal digital assistant 420 and the wireless intermediary unit 430, and the connection between the wireless intermediary unit 430 and the control network 218. A simple checksum or other error detection technique may be used. Any errors detected in these communication links cause the RF test function 615 of the application software to generate an error message on the RF test screen 520 of the personal digital assistant 420, thereby alerting the user of a potential problem.

Various miscellaneous features are also preferably provided in connection with the test and diagnostic features. For example, returning again to FIG. 15, user selection of a Power icon 467 on the diagnostic system main menu 460 may act to shut down the power to the personal digital assistant 420. User selection of a Help icon 466 on the diagnostic system main menu 460 displays a system help screen 530 on the screen display 422 of the personal digital assistant 420, an example of which is illustrated in FIG. 21. The help screen 530 provides on-line help for the various functions provided by the test and diagnosis application software running on the personal digital assistant 420. A scroll-down menu of help-topics may be provided, from which the user may make a selection in order to get further information on the topic.

It is thus apparent that a versatile, flexible and robust system has been provided for allowing remote testing and diagnosis of control networks and similar electronic systems. The various features provided as a result of the disclosed embodiments enhance allow for more convenient, rapid, efficient and reliable testing of control networks. Information is presented in an easily understandable format, and a convenient man-machine interface is provided.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A system for facilitating diagnosis and maintenance of electronic control networks, comprising:

a wireless diagnostic device adapted for manual transport, said wireless diagnostic device comprising a transmitter and receiver for communicating over a wireless communication channel with a control network to be monitored, diagnosed, or tested; and at least one wireless ground station, said at least one wireless ground station comprising a ground station receiver attuned to said wireless communication channel, whereby transmitted messages between said wireless diagnostic device and the control network over said wireless communication channel are monitored;

wherein said wireless diagnostic device comprises a self-contained graphical display device physically connected to a self-contained wireless intermediary unit through a cable connection, said wireless intermediary unit containing said transmitter and receiver for communicating over said wireless communication channel with said control network.

2. The system of claim 1, further comprising a memory storage device connected to said at least one wireless ground station, for storing transmitted messages monitored by said wireless ground station over said wireless communication channel.

3. The system of claim 1, further comprising at least one user terminal connected to said wireless ground station, said user terminal comprising a graphical display whereby information relating to said transmitted messages is displayed.

4. The system of claim 3, wherein said user terminal comprises a user interface and wherein said wireless ground station comprises a ground station transmitter.

5. The system of claim 4, whereby instructions regarding diagnostic or test procedures are transmitted by said ground station transmitter over said wireless communication channel in response to commands entered via said user interface.

6. The system of claim 4, whereby an instruction to terminate a diagnostic session is transmitted by said ground station transmitter over said wireless communication channel in response to a command entered via said user interface, said instruction preventing further diagnostic activity by said wireless diagnostic device with respect to said control network.

7. The system of claim 1, further comprising a diagnostic and maintenance information database connected to said at least one ground station, whereby information relating to said control network is retrieved in response to a remote request received from said wireless diagnostic device.

8. The system of claim 7, wherein said information relating to said control network comprises graphical information relating to said control network, said graphical information being displayed on a screen display at said wireless diagnostic device.

9. The system of claim 1, wherein said wireless diagnostic device is configured to transmit, in response to an entered command, a forced output instruction to said control network over said wireless communication channel, and wherein said control network is configured to respond to said forced output instruction by selecting values for one or more inputs to a controlled electronic circuit such that an output of a control network element is forced to a predetermined state, in the absence of a fault condition.

10. A diagnostic and maintenance system, comprising:
a portable wireless diagnostic device, said wireless diagnostic device comprising a transmitter and receiver for communicating over a wireless communication channel with a control network to be monitored, diagnosed, or tested;
a plurality of wireless ground stations, at least one of said wireless ground stations comprising a receiver attuned to said wireless communication channel whereby transmitted messages between said portable wireless diagnostic device and the control network are monitored;
a ground station interface connected to said plurality of wireless ground stations; and
a local area computer network connected to said ground station interface, said local area computer network comprising one or more user terminals, said one or more user terminals each comprising a screen display whereby information relating to said transmitted messages is displayed;
wherein said portable wireless diagnostic device comprises a self-contained graphical display device physically connected to a self-contained wireless intermediary unit through a cable connection, said wireless intermediary unit containing said transmitter and receiver for communicating over said wireless communication channel with said control network.

11. The diagnostic and maintenance system of claim 10, further comprising a memory storage device connected to said local area computer network, for storing transmitted messages monitored by said at least one wireless ground station over said wireless communication channel.

12. The diagnostic and maintenance system of claim 10, whereby instructions regarding diagnostic or test procedures are transmitted by said at least one ground station over said wireless communication channel in response to commands entered via said user interface.

13. The diagnostic and maintenance system of claim 10, whereby an instruction to terminate a diagnostic session is transmitted by said at least one ground station over said wireless communication channel in response to a command entered via said user interface.

14. The system of claim 10, further comprising a diagnostic and maintenance information database connected to said local area computer network, whereby information relating to said control network is retrieved in response to a remote request received from said portable wireless diagnostic device.

15. The system of claim 14, wherein said information relating to said control network comprises graphical information relating to said control network, said graphical information being displayed on a screen display at said portable wireless diagnostic device.

16. A diagnostic and maintenance system, comprising:
a plurality of portable wireless diagnostic devices, each comprising a transmitter and receiver, said portable wireless diagnostic devices communicating wirelessly with one or more control networks to be diagnosed, monitored, or tested, each of said portable wireless diagnostic devices programmed to perform at least one diagnosis or test function relating to said one or more control networks; and
at least one wireless ground station, said at least one wireless ground.station comprising a ground station receiver attuned to at least one wireless communication channel utilized by said portable wireless diagnostic devices, whereby transmitted messages between said portable wireless diagnostic devices and said one or more control networks are monitored;
wherein each of said portable wireless diagnostic devices comprises a self-contained graphical display device connected to a self-contained wireless intermediary unit through a cable connection, said wireless intermediary unit containing said transmitter and receiver for wirelessly communicating with said one or more control networks.

17. The diagnostic and maintenance system of claim 16, further comprising a ground station interface connected to said at least one wireless ground stations, and a local area computer network connected to said ground station interface, said local area computer network comprising one or more user terminals, said one or more user terminals each comprising a screen display whereby information relating to said transmitted messages is displayed.

18. The diagnostic and maintenance system of claim 17, further comprising a memory storage device connected to said local area computer network, for storing transmitted messages monitored by said at least one wireless ground station.

19. The diagnostic and maintenance system of claim 17, whereby instructions regarding diagnostic or test procedures are wirelessly transmitted by said at least one ground station in response to commands entered via said user terminals.

20. The diagnostic and maintenance system of claim 17, whereby an instruction to terminate a diagnostic session is wirelessly transmitted by said at least one ground station in response to a command entered via one of said user terminals.

21. The system of claim 17, further comprising a diagnostic and maintenance information database connected to said local area computer network, whereby information relating to said one or more control networks may be retrieved in response to a remote request received from any of said portable wireless diagnostic devices.

22. The system of claim 21, wherein said information relating to said control network comprises graphical information relating to a control network, said graphical information being displayed on a screen display at the requesting portable wireless diagnostic device.

23. The system of claim 1, wherein said control network resides in a vehicle and controls or monitors electronic functions of the vehicle.

24. The diagnostic and maintenance system of claim 10, wherein said control network resides in a vehicle and controls or monitors electronic functions of the vehicle.

25. The diagnostic and maintenance system of claim 1, wherein said control networks each reside in a vehicle and control or monitor electronic functions of the vehicles in which they reside.

26. A system for facilitating diagnosis and maintenance of electronic control networks, comprising:

a portable diagnostic device, said portable diagnostic device comprising a transmitter and receiver for communicating over a wireless communication channel with an on-vehicle control network, said on-vehicle control network comprising a control network wireless interface for communicating with said portable diagnostic device over said wireless communication channel; and at least one ground station, said at least one ground station comprising a ground station receiver attuned to said wireless communication channel, whereby said ground station monitors messages transmitted over said wireless communication channel between said portable diagnostic device and said on-vehicle control network;

wherein said portable diagnostic device comprises a self-contained graphical display device physically connected to a self-contained wireless intermediary unit, said wireless intermediary unit containing said transmitter and receiver for communicating over said wireless communication channel with said control network.

27. The system of claim 26, further comprising a memory storage device connected to said at least one wireless ground station, for storing transmitted messages monitored by said wireless ground station over said wireless communication channel.

28. The system of claim 26, further comprising at least one user terminal connected to said wireless ground station, said user terminal comprising a graphical display whereby information relating to said transmitted messages is displayed.

29. The system of claim 26, further comprising a diagnostic and maintenance information database connected to said at least one ground station, whereby information relating to said control network is retrieved in response to a remote request received from said wireless diagnostic device.

30. A method, comprising the steps of:

transmitting diagnostic messages between a portable diagnostic device and an on-vehicle control network over a wireless communication channel, said portable diagnostic device comprising a personal digital assistant, wherein said transmitting step comprises the step of transmitting messages between a self-contained wireless intermediary unit and the on-vehicle control network over said wireless communication channel; and monitoring the transmitted diagnostic messages at a ground station, said ground station comprising a ground station receiver attuned to said wireless communication channel.

31. The method of claim 30, further comprising the step of storing, in a memory storage device connected to said wireless ground station, transmitted messages received by said wireless ground station.

32. The method of claim 30, further comprising the step of displaying information relating to said transmitted messages on a graphical display of a user terminal connected to said wireless ground station.

33. The method of claim 32, further comprising the step of transmitting instructions regarding diagnostic or test procedures by said ground station over said wireless communication channel in response to commands entered via a user interface at said user terminal.

34. The method of claim 33, further comprising the step of retrieving, in response to a remote request received from said portable diagnostic device, information relating to said on-vehicle control network from a diagnostic and maintenance information database connected to said ground station.

* * * * *